US012801215B2

(12) United States Patent
Krueger et al.

(10) Patent No.: US 12,801,215 B2
(45) Date of Patent: Nov. 17, 2026

(54) DISPLAY SYSTEM, DISPLAY METHOD, AND STORAGE MEDIUM

(71) Applicant: HONDA MOTOR CO., LTD., Tokyo (JP)

(72) Inventors: Matti Krueger, Wako-shi (JP); Yu Fang, Wako-shi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/068,042

(22) Filed: Mar. 3, 2025

(65) Prior Publication Data

US 2025/0291412 A1 Sep. 18, 2025

(30) Foreign Application Priority Data

Mar. 12, 2024 (JP) ................................ 2024-038299

(51) Int. Cl.

| | |
|---|---|
| ***G06F 3/01*** | (2006.01) |
| ***G02B 27/00*** | (2006.01) |
| ***G02B 27/01*** | (2006.01) |
| ***G06V 40/18*** | (2022.01) |

(52) U.S. Cl.

CPC ......... *G06F 3/013* (2013.01); *G02B 27/0093* (2013.01); *G02B 27/0172* (2013.01); *G06V 40/18* (2022.01); *G02B 2027/014* (2013.01)

(58) Field of Classification Search

None

See application file for complete search history.

(56) References Cited

U.S. PATENT DOCUMENTS

| | | | | |
|---|---|---|---|---|
| 11,079,999 | B2 | 8/2021 | Chen | |
| 2002/0044152 | A1* | 4/2002 | Abbott, III ............ | G06T 19/006 345/629 |
| 2019/0286406 | A1* | 9/2019 | Chen ..................... | G06F 3/1454 |

FOREIGN PATENT DOCUMENTS

| | | |
|---|---|---|
| JP | 7068709 | 5/2022 |

* cited by examiner

*Primary Examiner* — Nicholas J Lee

(74) *Attorney, Agent, or Firm* — Amin, Turocy & Watson, LLP

(57) ABSTRACT

A display system includes a target of attention determination portion that determines a target of attention; and an image generator that generates an eye image which displays an image related to a target of attention that is overlain and displayed in an eye or on the eye, and causes the eye image to be displayed on a display device. The image generator causes the eye image, which is a video of a changing target of attention that is overlain and displayed in the eye or on the eye according to determination results of the target of attention, to be displayed on the display device.

18 Claims, 17 Drawing Sheets

DISPLAY SYSTEM, DISPLAY METHOD, AND STORAGE MEDIUM

CROSS-REFERENCE TO RELATED APPLICATION

Priority is claimed on Japanese Patent Application No. 2024-038299, filed Mar. 12, 2024, the content of which is incorporated herein by reference.

TECHNICAL FIELD

The present invention relates to a display system, a display method, and a storage medium.

BACKGROUND

In recent years, research and development regarding robots that are able to communicate with humans is advancing. For example, a method for energizing communication with the human is by having an image of the human eyes be imitated on a face region of the robot. Also, a method where expressivity of the eyes of the robot is increased by having the image of the human eyes change according to the situation has also been suggested (e.g., refer to Japanese Patent No. 7068709).

Also, to be able to confirm from an outside, what a user wearing a head mount display is paying attention to in a virtual space, a different technology that involves a method of causing information regarding a location of the attention of the user within the virtual space to be displayed on a front display of the head mounted display to has been proposed (e.g., refer to U.S. patent Ser. No. 11/079,999).

Information regarding a direction in which a human eye is paying attention to plays a very important role in communication. Specifically, by monitoring the direction that the eye is paying attention to, it is possible to grasp what a person is looking at. By also following the direction that the human is paying attention to, it is possible to grasp what the person is paying attention to. Conventional robot technology is configured to where it is possible for a user to have an overall grasp on information regarding a direction in which the robot is paying attention to, by causing an image of an eye that is displayed on a display unit or the like of the robot to move. However, being able to grasp the target of attention of the robot within a three-dimensional real space, based on information of eye movement of the robot in such two-dimensional based display is ambiguous. Specifically, when many would to be objects exist in the real three-dimensional space, the user is prone to mistaking what the target of attention of the robot is.

In the method of a technology in which a head mounted display is utilized, a third person needs to take steps of confirming a construction of the virtual space that is displayed on the front display of the head mounted display, of confirming a location that a user wearing the head mounted display is paying attention to, and of confirming the object that corresponds to said location. As such, it is very difficult for the third person to intuitively and easily grasp what the target of attention of the user is. Also, if the virtual space is caused to be displayed on the front display of the head mounted display, there is an incompatibility between what the third person sees and with the outer appearance of the user is, and is therefore a hindrance to communication.

SUMMARY

The present invention is made with the above problem in mind, and an object thereof is to provide a display system, a display method, and a storage medium that make it possible to provide information regarding a target of attention.

(1) To achieve the aforementioned, an embodiment of a display system according to the present invention includes a processer configured to execute a program to determine a target of attention, and generate an eye image which displays an image related to a target of attention image that is overlain and displayed in an eye or on the eye, and causes the eye image to be displayed on a display device. The processor causes the eye image, which is a video of a changing target of attention image that is overlain and displayed in the eye or on the eye according to determination results of the target of attention, to be displayed on the display device.

(2) In the display system of (1), the processor may adjust a transparency of the target of attention image.

(3) In the display system of (1), the processor may adjust at least a location where the target of attention image is displayed, or a size thereof on the eye image.

(4) In the display system of (1), the processor may generate the target of attention image by adjusting a captured target of attention image.

(5) In the display system from (1) to (4), the target of attention may be persons that exist in a surrounding environment of the display system, or persons that exist in a separate environment that is connected so as to be able to communicate with the display system.

(6) In the display system from (1) to (4), the eye image may include an image of a background of the target of attention that changes along with a change of the target of attention.

(7) In the display system of (6), the processor may generate eye images, which are a video that combines a movement of a display location of the eye and the movement of the background on an inside of the eye image.

(8) In the display system from (1) to (4), the processor may determine the target of attention based on images captured from the surrounding environment of the display system, or from the separate environment that is connected so as to be able to communicate with the display system.

(9) In the display system of (8), the processor may generate the target of attention image by extracting portions that correspond to the target of attention from the captured image.

(10) In the display system from (1) to (4), the processor may determine the target of attention based on an operational state of the display system.

(11) In the display system of (10), the target of attention may be an image that is related to the operational state of the display system.

(12) In the display system from (1) to (4), the display system may be a communication system that conducts communication with a human, and the target of attention may be a target that the communication system is paying attention to.

(13) In the display system from (1) to (4), the display system may be a display device wearable by the person, and the object of attention may be an object that the user is paying attention to.

(14) In the display system of (13), the processor may cause a generated image to be displayed on an outer display that is provided on the wearable device.

(15) In the display system of (13), the processor may cause the generated eye image to be displayed on an outside display device that is connected so as to be able to communicate with the wearable device.

(16) In the display system of (13), the processor may display the generated eye image on displays of other wearable devices which are connected so as to be able to communicate with the wearable device.

(17) A display method according to another embodiment of the present invention is performed by a computer of the display system, and includes a method of determining a target of attention, generating an eye image which displays an image related to a target of attention image that is overlain and displayed in an eye or on the eye, causing the generated eye image to be displayed on a display device, and causing the eye image, which is a video of a changing target of attention image that is overlain and displayed in the eye or on the eye according to determination results of the target of attention image, to be displayed on the display device.

(18) A non-transitory computer-readable storage medium storing a program for causing a computer of a display system according to another embodiment of the present invention to cause a target of attention to be determined, cause an eye image which displays an image related to a target of attention image that is overlain and displayed in an eye or on the eye to be generated, cause the generated eye image to be displayed on a display device, and cause the eye image, which is a video of a changing target of attention image that is overlain and displayed in the eye or on the eye according to determination results of the target of attention image, to be displayed on the display device.

According to (1) through (18) above, it is possible to provide information regarding a target of attention.

DETAILED DESCRIPTION

First Embodiment

Figure 1:
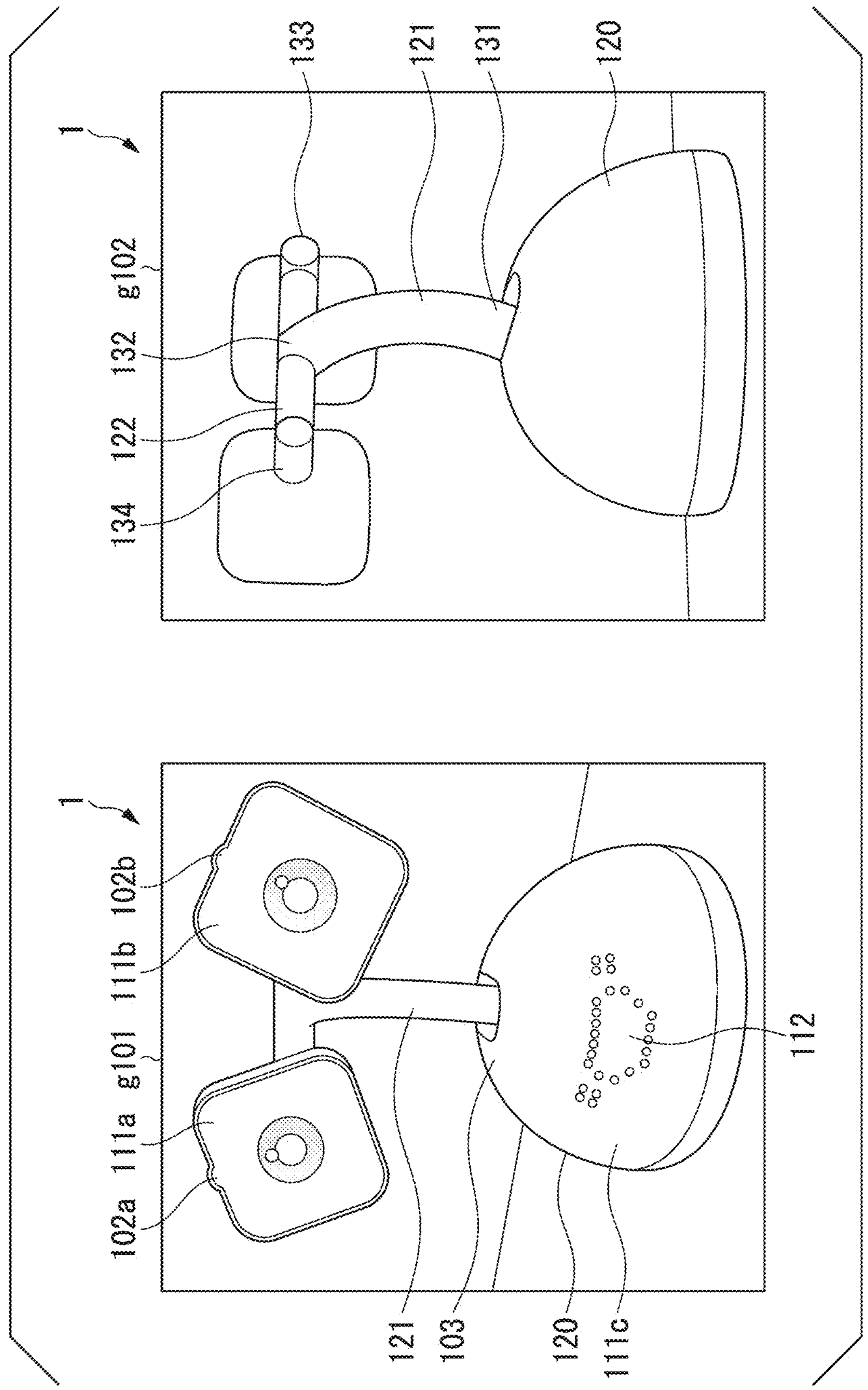
FIG. 1 A view that shows an outer appearance of a communication robot, according to a first embodiment.

Hereinafter, embodiments of the present invention are explained with reference to the drawings. Scales and dimensions of various members in the drawings used for the explanations below are suitably scaled so that sizes of the various members are recognizable. In all the drawings that explain the various embodiments, parts that have the same function have the same reference signs affixed thereto, with redundant explanations thereof being omitted. In the present application, the term "based on XX" means "is at least dependent on XX", and includes a case where a component added to XX is being based on as well. The term "based on XX" is not limited to directly being used for XX, and the term may include XX having arithmetic operations, or machining operations being carried out thereupon. "XX" may be any arbitrary component (arbitrary information information).

<Outline of Communication Robot>

An embodiment of a communication robot includes a communication robot that conducts communication with one or a plurality of persons (hereinafter referred to as "users"). The communication is mainly consists of conversation and gestures (movements). Movements include actual movements, and movements that realized by images that are displayed on a display unit. The communication robot for example, carries out communication with a plurality of persons in any place (class room, meeting room or the like) a plurality of persons gather.

A human eye possess a smooth outer surface that reflects a portion of light, and is capable of acting as a convex mirror in a scenario where the eye is faced directly. Causing an image of an object that the communication robot is paying attention to (herein referred to as "target of attention") be displayed on an inside of an image that imitates a view of the human eye (herein referred to as "eye image") makes it possible for the communication robot according to the embodiment, which is inspired by the above features of the human eye, to provide information regarding the target of attention of the communication robot to the user.

Since the eye image of the robot is larger than a human eye, and is something that is displayed as a large image on the display, it makes it easy to provide information about the direction that the communication robot is gazing in (focus of the eye) and the target of attention thereof, while making it easy to attract the user's attention. During regular communication between people, in order to understand the target of attention of the other person, it is necessary to grasp which direction the other person is gazing in. Furthermore, two steps of mapping said direction on a space, and determining the target of attention is necessary. In contrast to the above, the communication robot according to the embodiment makes it possible for the user to conduct both aforementioned steps in a single easy step, while making it possible to realize effective communication.

The users respond to the communication robot's actions with expressions, gestures, and voice or the like. For example, the communication robot realizes communication via speech and actions, using content learned through machine learning technology. The "display system" is an example of the communication robot. Furthermore, the robot is not limited to a "display system", and may be any device capable of communication.

<Example of Outer Appearance of the Communication Robot>

Next, an example of an outer appearance of the communication robot 1 is explained. FIG. 1 shows an example of an outer appearance of the communication robot 1, according to the first embodiment. In FIG. 1, a front surface g101, and a side surface g102 are views that show examples of the outer appearance of the communication robot 1 according to the first embodiment. For example, the communication robot 1 includes three display units 111 (an eye display unit 111*a*, an eye display unit 111*b*, and a mouth display unit 111*c*). An image capturing unit 102*a* is attached to a top portion of the eye display unit 111*a*, and an image capturing unit 102*b* is attached to a top portion of the eye display unit 111*b*. The eye display units 111*a* and 111*b* display images and image information that the users are able to see. The eye display units 111*a* and 111*b* are for example, LCD image display devices, or organic EL (Electro Luminescence) image display devices or the like. A size of each screen of the eye display unit 111*a* and of the eye display unit 111*b* may for example, be 3 inches. A speaker 112 is attached to the vicinity of the mouth display unit 111*c*, which displays an image that corresponds to a human mouth on a housing 120. The mouth display unit 111*c* is for example, configured of a plurality of LEDs (light emitting diodes), where it is possible to designate an address of each LED, and it is possible for each LED to operate by turning ON or OFF individually. A sound collector 103 is attached to the housing 120.

The communication robot 1 includes a boom 121. The boom 121 is attached to the housing 120, so as to be movable via a movable portion 131. A horizontal bar 122 is attached so as to be rotatable via a movable portion 132, to the boom 121. In the horizontal bar 122, the eye display unit 111*a* is attached so as to be rotatable via a movable portion 133, and the eye display unit 111*b* is attached so as to be rotatable via a movable portion 134. The outer appearance of the communication robot 1 shown in FIG. 1 is only an example, and an outer appearance thereof is not limited thereto.

<Configuration Example of the Communication Robot>

Figure 2:
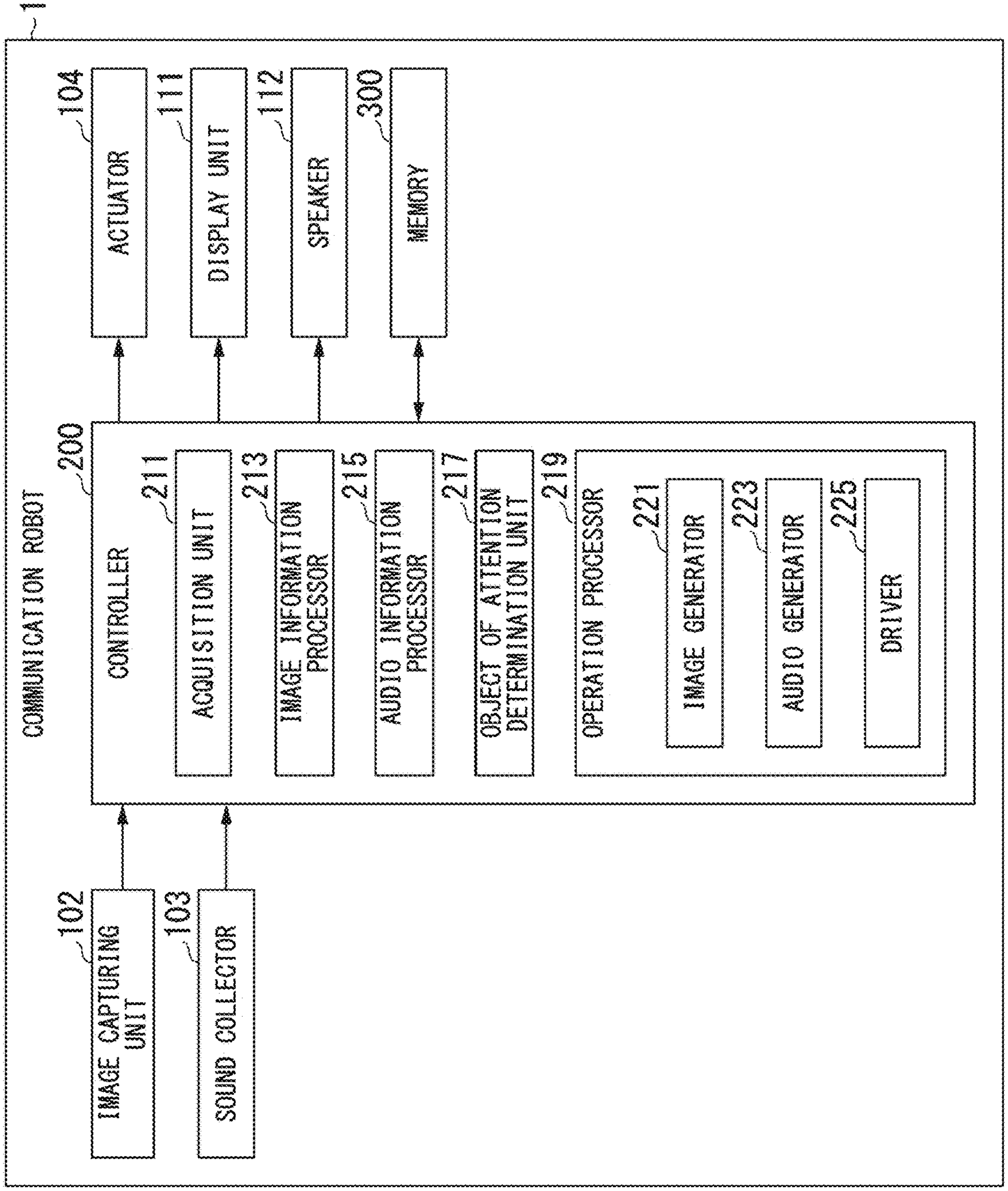
FIG. 2 A functional block diagram that shows a configuration example of the communication robot, according to the first embodiment.

Next, a configuration example of the communication robot 1 is explained. FIG. 2 is a functional block diagram that shows a configuration example of the communication robot 1, according to the first embodiment. The communication robot 1 for example, includes an image capturing unit 102, the sound collector 103, an actuator 104, the display unit 111, the speaker 112, a controller 200, and a memory 300.

The image capturing unit 102 captures images of an environment in which the communication robot 1 is setup. As shown in FIG. 1, the image capturing unit 102 for example, includes the image capturing unit 102*a* and the image capturing unit 102*b*. The image capturing unit 102 may be setup in an environment where the communication robot 1 and the users are present. The image capturing unit 102 for example, may be a CMOS (Complementary Metal Oxide Semiconductor; Complementary Metal Oxide Semiconductor) image capturing terminal, or a CCD (Charge Coupled Device; Charged Coupled Device) image capturing terminal or the like. Image information that the image capturing unit 102 captures is for example, an image that includes faces of the users. An "image" may refer to a still image, sequential still images, or an image out of a video.

The sound collector 103 collects (records) sounds (acoustic signals) in the environment that the communication robot 1 is setup in. The sound collector 103 for example, is a microphone array that includes a plurality of microphones.

The actuator 104 drives various parts of the communication robot 1, according to direction from the controller 200.

As shown in FIG. 1 for example, the display unit 111 includes the eye display unit 111*a*, the eye display unit 111*b*, and the mouth display unit 111*c*. The display unit 111 displays an image or an animation, based on direction from the controller 200.

The speaker 112 outputs the acoustic signal based on direction from the controller 200.

The controller 200 for example, includes an acquisition unit 211, an image information processor 213, an audio information processor 215, a target of attention determination unit 217, and an operation processor 219. For example, a hardware processor (computer) of a CPU (Central Processing Unit) or the like may realize each of the functional units mentioned above by executing a program (software). A part of, or all of said configuration components may be realized by hardware (circuits; circuitry included) such as an LSI (Large Scale Integration) or ASIC (Application Specific Integrated Circuit), an FPGA (Field-Programmable Gate Array), a GPU (Graphics Processing Unit), an SOC (System on Chip) or the like, and may be realized by a collaboration of hardware and software. The program may be stored beforehand on a storage device of an HDD or a flash memory or the like of the communication robot 1 (a memory device that includes a non-transitory storage medium), or may be stored on a removable storage medium such as a DVD, a CD-ROM or the like, and installed on an HDD or flash memory of the communication robot 1 when the storage medium (non-transitory storage medium) is attached to a drive device thereof.

The acquisition unit 211, obtains image information captured using the image capturing unit 102, and obtains audio information using the sound collector 103. The acquisition unit 211 may obtain desired image information via a network of the internet or the like.

The image information processor 213 conducts known image processing on images that are captured by the image capturing unit 102. Known image processing for example, is feature detection, threshold, edge detection, contour detection, clustering processing or the like. Further, the image information processor 213 uses information having image processing conducted thereto, to detect a human face for example.

The audio information processor 215 conducts known audio processing on an acoustic signal recorded by the sound collector 103. Known audio processing for example, is sound recognition, speech recognition, or the like.

The target of attention determination unit 217 determines the target of attention of the communication robot 1. For example, the target of attention determination unit 217 determines the target of attention, based on the image captured by the image capturing unit 102 (result of the image information processor 213), and on the acoustic signal recorded by the sound collector 103 (result of the audio information processor 215). Besides the above, the target of attention determination unit 217 may judge the target of attention based on current contents of the actions of the communication robot 1.

In addition to judging the target of attention, the target of attention determination unit 217 may judge a degree of attention of the target of attention. For example, the target of attention determination unit 217 may judge the degree of attention in such a way where the degree of attention is higher for faces of persons that are closer to, more than faces of persons that are farther from the communication robot 1, and the degree of attention is higher for faces of persons who are moving, more than the faces of the persons that are not moving, based on the images captured by the image capturing unit 102 and on the acoustic signals recorded by the sound collector 103. For example, the target of attention determination unit 217 may judge the degree of attention to be higher for objects of attention that are highly related to the current contents of the actions of the communication robot 1.

The target of attention determination unit 217, is an example of a "target of attention determination unit". The target of attention determination unit 217 determines the target of attention that a communication system is paying attention to. The target of attention is persons that exist in a surrounding environment of the communication system, or persons that exist in a separate environment that is connected so as to be able to communicate with the communication system. A display location of the target of attention moves on the eye image along with the movement of persons. The eye image includes an image of a background of the target of attention that changes along with a change of the target of attention (for example, movement of persons). An image generator 221 generates eye images, which are a video that combines the movement of the display location of the eye on an inside of the eye image, and the movement of the background. The target of attention determination unit 217 determines the target of attention based on images captured from the surrounding environment of the communication system, or from the separate environment that is connected so as to be able to communicate with the communication system. The target of attention determination unit 217 determines the target of attention based on an operational state of the communication system.

The operation processor 219 controls operations of the communication robot 1. The operation processor 219 for example, generates images that are shown on the eye display unit 111*a*, the eye display unit 111*b*, and on the mouth display unit 111*c*, generates a drive signal that drives the actuator 104, and generates sound that is output from the speaker 112. The operation processor 219 for example, includes the image generator 221, an audio generator 223, and a driver 225.

The image generator 221 generates the eye image (video) to be displayed on the eye display unit 111*a* and eye display unit 111*b*, based on determination results of the target of attention from the target of attention determination unit 217, and causes the generated eye image to be displayed on the eye display unit 111*a* and the eye image on the eye display unit 111*b*. The eye image that is shown is an image that corresponds to a movement of the human eyes. The image generator 221 generates an image (still image, continuous still image, or video) to be displayed on the mouth display unit 111*c*, and causes the generated image to be displayed on the mouth display unit 111*c*. The displayed image corresponds to an image of movement of a human mouth.

An image that corresponds to the target of attention image is included in the eye or on the eye that is generated by the image generator 221. For example, in a case where a face of a person is reflected on an image that is captured by the image capturing unit 102, the image of the face of the person is included in the eye image or on the eye image. Or, when the image (for example an icon) corresponds to the contents of the present actions of the communication robot 1, an image of the icon is included in the eye or on the eye of the eye image. To obtain a mirror image thereof, the image generator 221 adjusts the captured image of the person by applying horizontal inversion processing, trimming and smoothing filters, and changing or the like of brightness and contrast to the captured image of the person, so as to generate the target of attention image. In other words, the image generator 221 obtains the target of attention image by adjusting the captured target of attention image. Details of processing done by the image generator 221 are mentioned later on.

The image generator 221 is an example of an "image generator". The image generator 221 generates the eye image, which is judged to be related to the target of attention image and is overlain and displayed in the eye or on the the eye of the eye image, and causes the generated eye image to be displayed on the display device. The image generator 221 causes the eye image, which is a video of the changing target of attention image that is overlain and displayed in the eye or on the eye, to be displayed on the display device according to determination results of the target of attention during communication. The image generator 221 generates the target of attention image by extracting portions that correspond to the target of attention from the captured image. The target of attention image is the image that is related to the operational state of the communication system.

The audio generator 223 generates an output acoustic signal that is to be output from the speaker 112, and outputs the generated output acoustic signal from the speaker 112. The audio generator 223 for example, generates the output acoustic signal using a learning model having learned contents from conversations and operation statuses that are communication with humans and/or from video, using machine learning technology.

The driver 225 for example, generates the drive signal that drives the actuator 104 of the neck, and drives the actuator 104 using the generated drive signal. The driver 225 for example, uses the aforementioned machine learning model to generate the drive signal.

The memory 300 stores the various programs, algorithms, learning models, predetermined values, and threshold values or the like that are needed for processing of the various controls of the communication robot 1. The memory 300 for example, stores a language model database, an acoustic model database, a conversation co-path database, acoustic features, a comparison image database used during image recognition, and an amount of image recognition that are used during sound recognition. The memory 300 may be realized by the aforementioned various storage devices, in other words, an SSD (Solid State Drive), EEPROM (Electrically Erasable Programmable Read Only Memory), ROM (Read Only Memory), RAM (Random Access Memory) or the like. The memory 300 may also disposed on a cloud, and may also be connected via a network.

The communication robot 1 shown in FIG. 2 is an example of a configuration thereof, and is not limited thereto. For example, the communication robot 1 may have a single display unit, a single capturing unit, and may have a processor to conduct interactions with a plurality of persons.

<Example of Control of the Communication Robot>

Next, an example of control of the communication robot 1 is explained. In the first embodiment, since a gaze of the communication robot 1 moves towards the direction of the target of attention of the communication robot 1, movement of the eyes and neck thereof are consequently controlled.

First, the eye movement is explained. The image generator 221 moves a center of the eye in accordance with the target of attention. In the eye image for example, a range of motion of a pupil is predetermined beforehand. The image generator 221 moves a point of focus of the eye within this predetermined range so as to correspond to the target of attention.

Next, movement of the neck is explained. In a case where the target of attention is located out of range, the image generator 221 first moves the point of focus to a focus point of a location that is to be displayed of the image of the eye. Furthermore, the driver 225 starts to move the head in the same direction, so as to return a location of the eye on the eye display unit 111*a* and the eye on the eye display unit 111*b* to within a range of the center.

When a target of attention that should have attention paid to is around the communication robot 1, first the eye of the communication robot 1 moves towards said target of attention, then the neck of the communication robot 1 begins to move at an angle having the same size, towards the same direction. As such, the gaze thereof is controlled in such a way as to be guided by the target of attention.

<Example of the Eye Display Mode>

(1) First Display Mode (Pupil Display)

Figure 3:
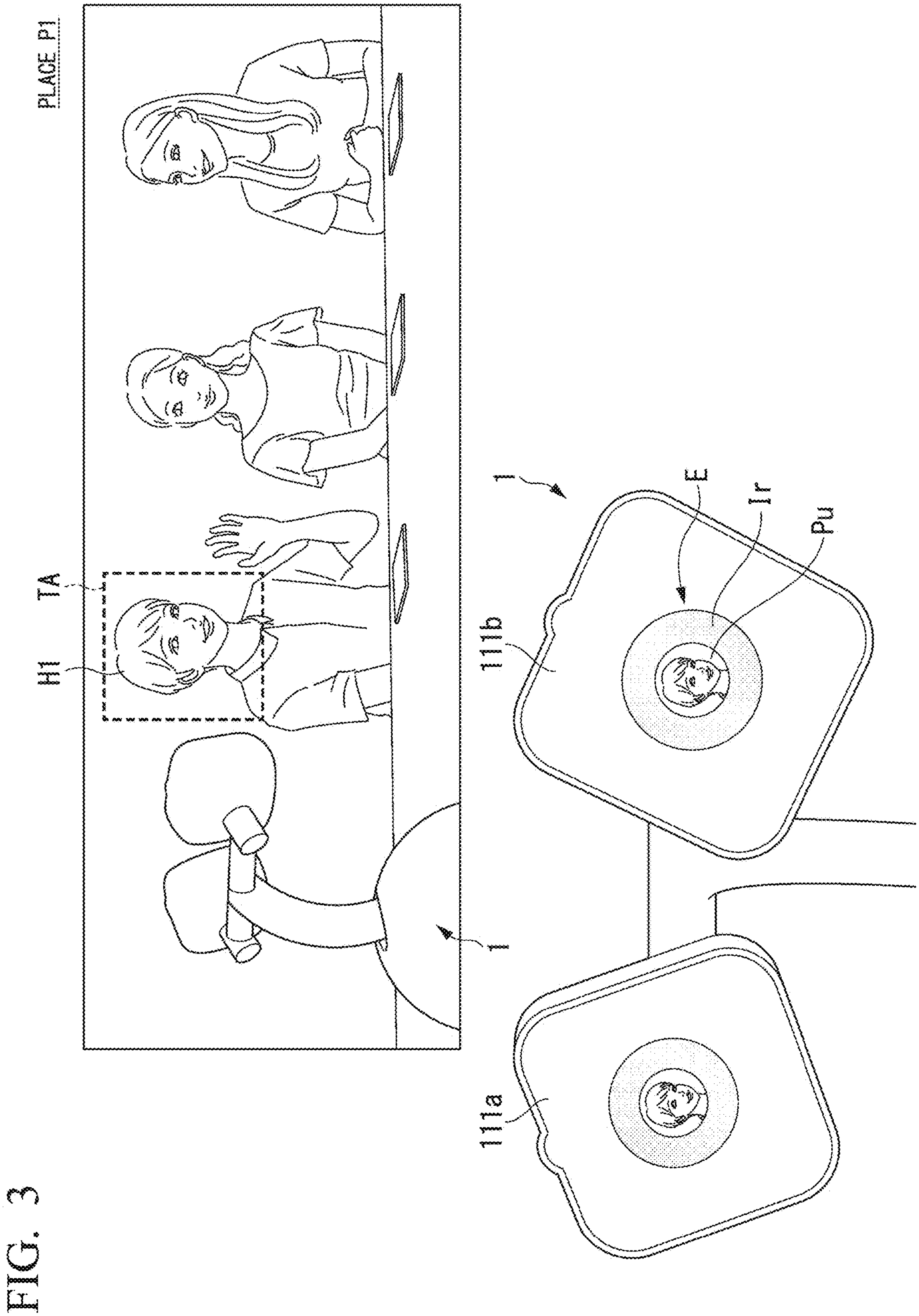
FIG. 3 A view that shows a first display mode (pupil display), according to the first embodiment.

Next, an example of a display mode of the eye shown on the eye display unit 111*a* and shown on the eye display unit 111*b* of the communication robot 1 is explained. FIG. 3 is a view that shows a first display mode (pupil display), according to the first embodiment. In FIG. 3, a situation where the communication robot 1 is used in place P1, in which a plurality of users are seated together, is explained. The place P1 for example, is a class room, or a meeting room or the like. In such example, the communication robot 1 determines that a face of a person H1, who has their hand raised, is seated on the left end out of the three persons, and is speaking, is considered to be a target of attention TA. Under such conditions, an “E” eye image is displayed on the eye display unit 111*a* and displayed on the eye display unit 111*b* of the communication robot 1. An iris Ir and a pupil Pu are included in the E eye image. An image of a target of attention TA (the face of person H1) which is displayed on the pupil Pu, in the first display mode (pupil display). It is possible for the three persons that are present to grasp that the communication robot 1 is paying attention to the target of attention TA (the face of person H1), by being able to recognize that the image shown on the eye display unit 111*a* and shown on the eye display unit 111*b* is that of the target of attention TA (the face of person H1).

Figure 4:
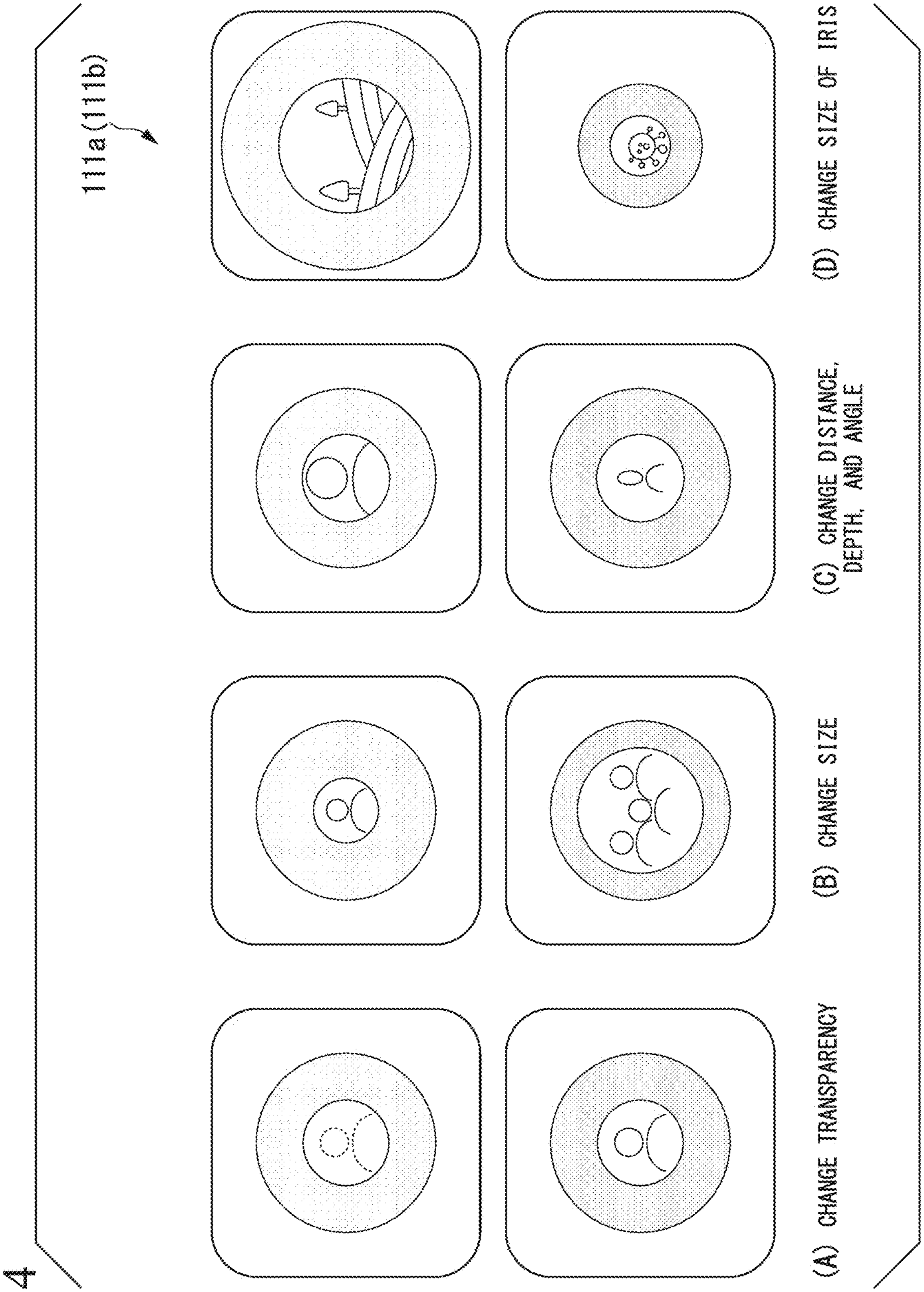
FIG. 4 A view that shows various display patterns of the first display mode (pupil display), according to the first embodiment.

It is possible to change a pattern of the image that is shown on the pupil Pu according to the degree of attention towards the target of attention TA in the communication robot 1, the situation in which the communication robot 1 is used, and the preferences or the like of the user. FIG. 4 is a view that shows various display patterns of the first display mode (pupil display), according to the first embodiment. As shown in FIG. 4 (A), a transparency of the image shown on the pupil Pu may be such that the transparency thereof is changeable. For example, the higher the degree of attention towards the target of attention TA is, the more the transparency of the image shown on the pupil Pu decreases (the image becomes clearly visible). As shown in FIG. 4 (B), it is possible to have a size of the pupil Pu (in other words, image size thereof) be changeable. For example, the higher the degree of attention is towards the target of attention TA is, the larger the pupil Pu may become. As shown in FIG. 4 (C), a location (distance, depth, angle) of the target of attention TA included in the image which is displayed on the pupil Pu may be changeable. For example, the higher the degree of attention towards the target of attention TA is, the more the location (the distance to and the depth thereof become shorter) of the target of attention TA may be towards the front. As shown in FIG. 4 (D), a size of the iris Ir (and/or a size of the pupil Pu) may be changeable. For example, the higher the degree of attention is towards the target of attention TA is, the larger the iris IR (and/or the larger the size of the pupil Pu becomes) may become.

Besides the aforementioned, as a pattern of the image shown on the pupil Pu, an image saturation, brightness, resolution, and/or distortion, and/or a shape and/or color of the pupil, shape and/or color of the iris, relative positional relationship of the pupil and the iris, color of a white of the eye, timing of showing the image, direction, continuity, and a position or the like may be changed. A different pattern may be shown on the left eye than the pattern shown on the right eye.

(2) Second Display Mode (Lens Display)

Figure 5:
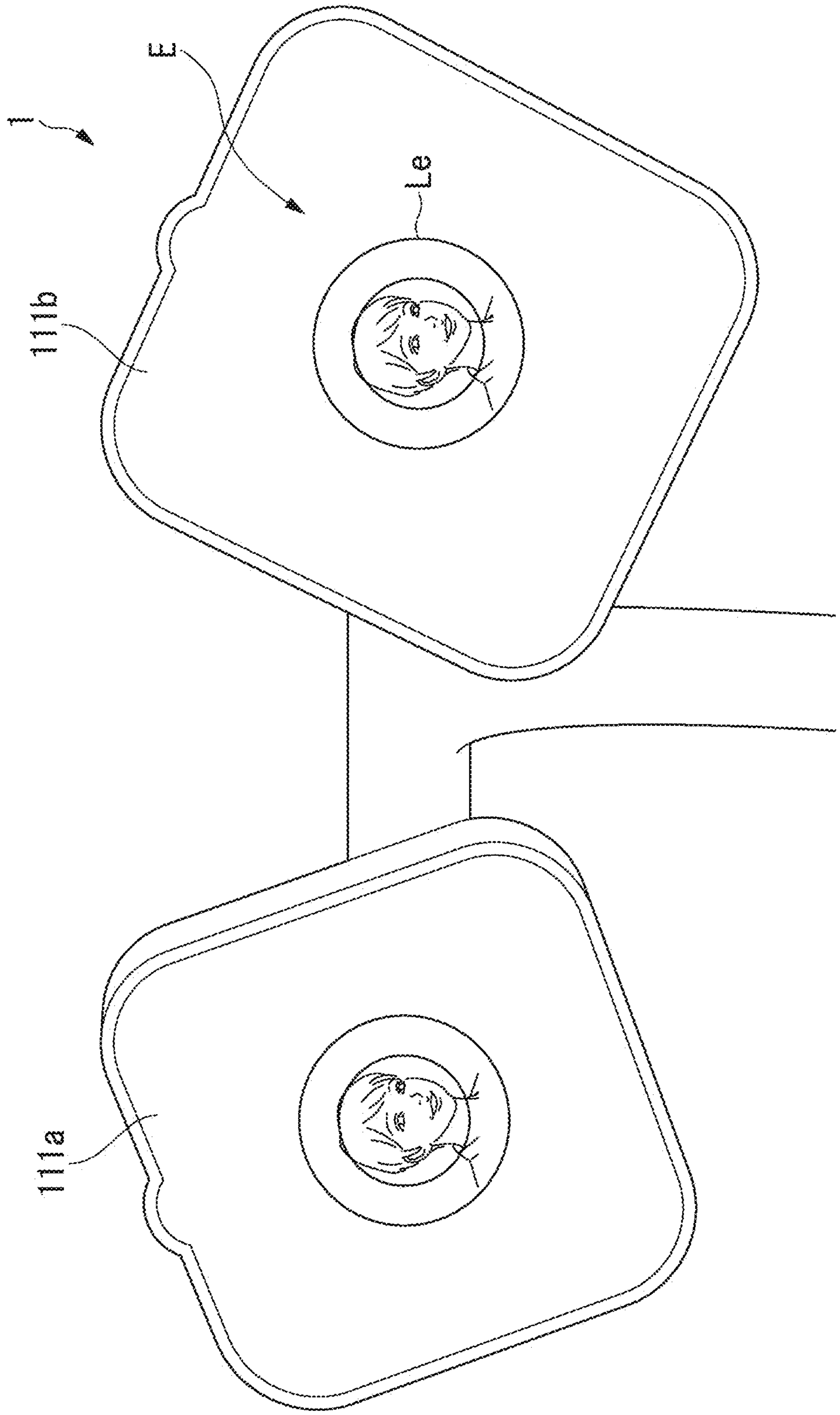
FIG. 5 A view that shows a second display mode (lens display), according to the first embodiment.

FIG. 5 is a view that shows a second display mode (lens display), according to the first embodiment. Under the same situation as the situation in FIG. 3, an eye image E is displayed on the eye display unit 111*a* and is displayed on the eye on the eye display unit 111*b*. A lens Le (lens display), which includes an entirety of the iris Ir and the pupil Pu, is included in the eye image E. In the second display mode (lens display), a target of attention image TA (face of the person H1) is displayed over the entirety of the lens Le.

Figure 6:
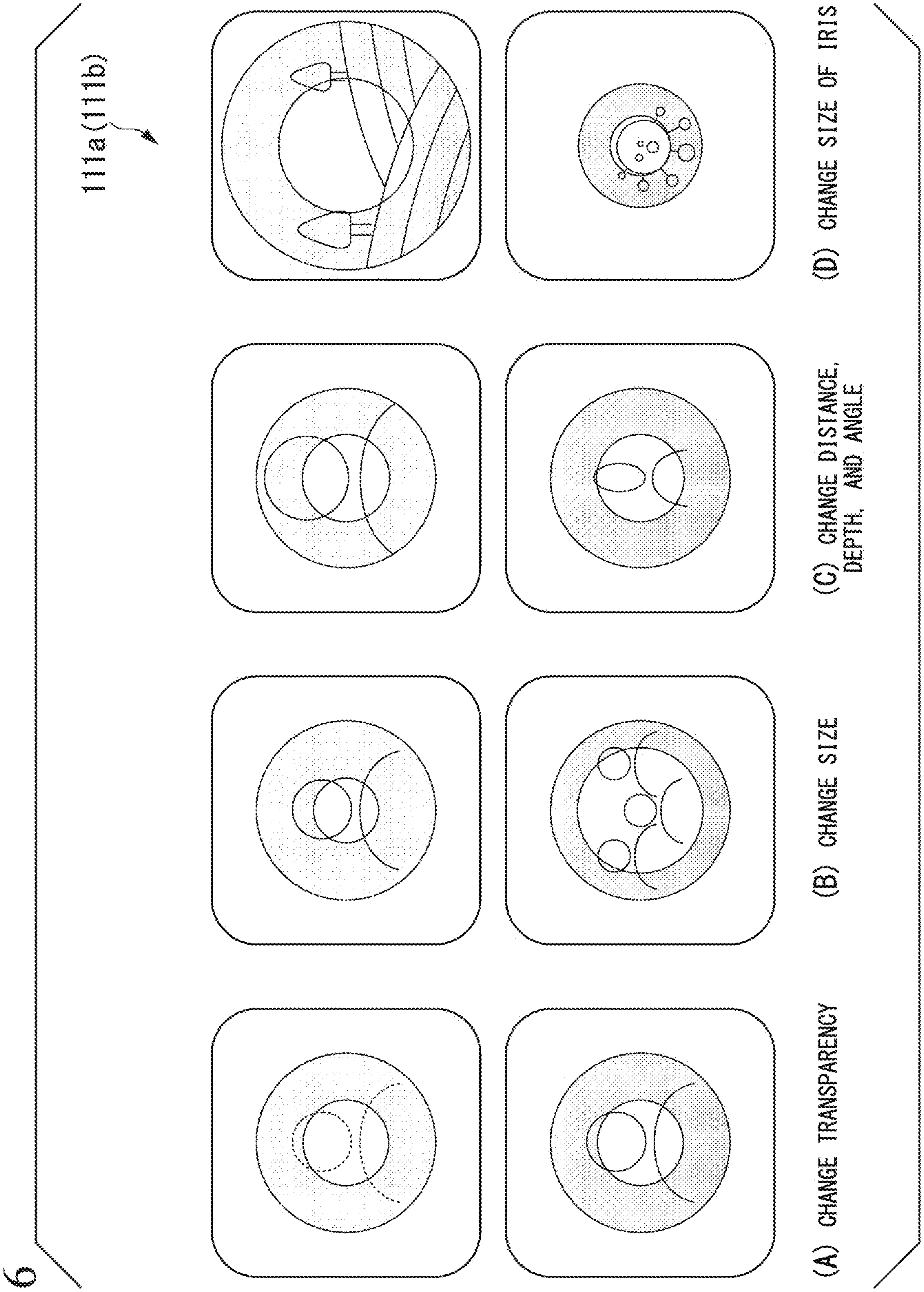
FIG. 6 A view that shows various display patterns of the second display mode (lens display), according to the first embodiment.

The pattern of the image which is shown on the lens Le is the degree of attention to the target of attention TA in the communication robot 1, and the condition in which the communication robot 1 is being used, both of which are changeable according to preferences or the like of the user. FIG. 6 is a view that shows various display patterns of the second display mode (lens display), according to the first embodiment. As shown in FIG. 6 (A), the image shown on the lens Le may have a transparency thereof changeable. For example, the higher the degree of attention towards the target of attention TA is, the more the transparency of the image shown on the lens Le decreases (the image becomes clearly recognizable). As shown in FIG. 6 (B), a size of a pupil may be changeable. For example, the higher the degree of attention towards the target of attention TA is, the larger the size of the pupil may become. As shown in FIG. 6 (C), a location (distance, depth, angle) of the target of attention TA included in the image which is displayed on the lens Le may be changeable. For example, the higher the degree of attention towards the target of attention TA is, the more the location (the distance to and the depth thereof become shorter) of the target of attention TA may be towards the front. As shown in FIG. 6 (D), a size of the iris Ir (or size of the pupil Pu) may be changeable. For example, the higher the degree of attention towards the target of attention TA is, the larger the size of the iris Ir (and/or the size of the pupil Pu) may become.

Besides the aforementioned, as a pattern of the image shown on the lens Le, an image saturation, brightness, resolution, and/or distortion, and/or a shape and/or color of the pupil, shape and/or color of the iris, relative positional relationship of the pupil and the iris, color of a white of the eye, timing of showing the image, direction, continuity, and a position or the like may be changed. A different pattern may be shown on the left eye than the pattern shown on the right eye.

(3) Third Display Mode (Overall Display)

Figure 7:
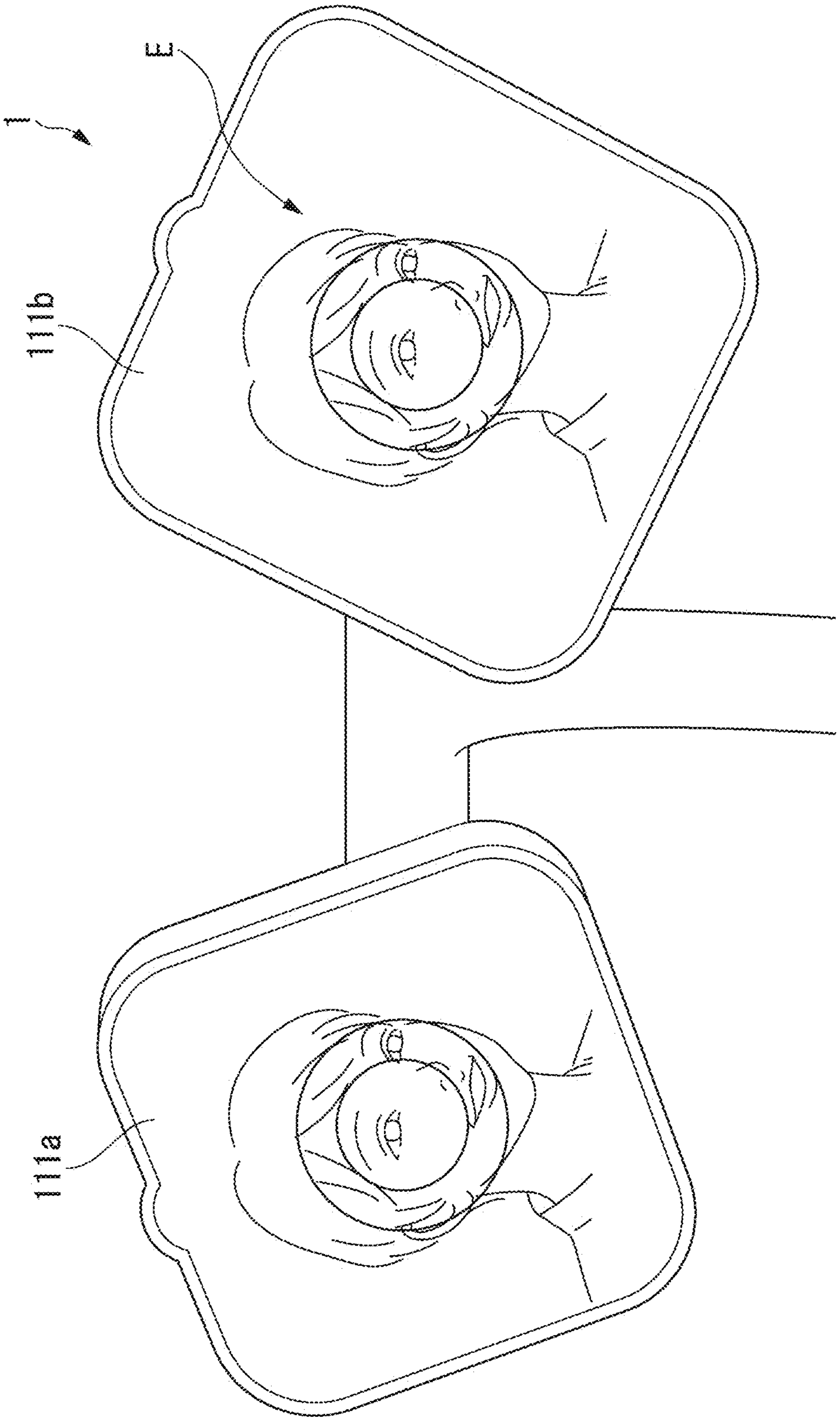
FIG. 7 A view that shows a third display mode (overall display), according to the first embodiment.

FIG. 7 is a view that shows a third display mode (overall display), according to the first embodiment. Under the same situation as the situation in FIG. 3, the eye image E is displayed on the eye display unit 111*a* and is displayed on the eye display unit 111*b* of the communication robot 1. In the third display mode (overall display), a target of attention image TA (face of the person H1) and a background target of attention image TA is displayed over the entirety of the eye display unit 111*a* and the entirety of the eye display unit 111*b*. The position (vicinity of a mouth of the person H1) that is being paid attention to most out of the target of attention TA (the face of the person H1) by the communication robot 1 is disposed in a location that corresponds to the eye image E.

Figure 8:
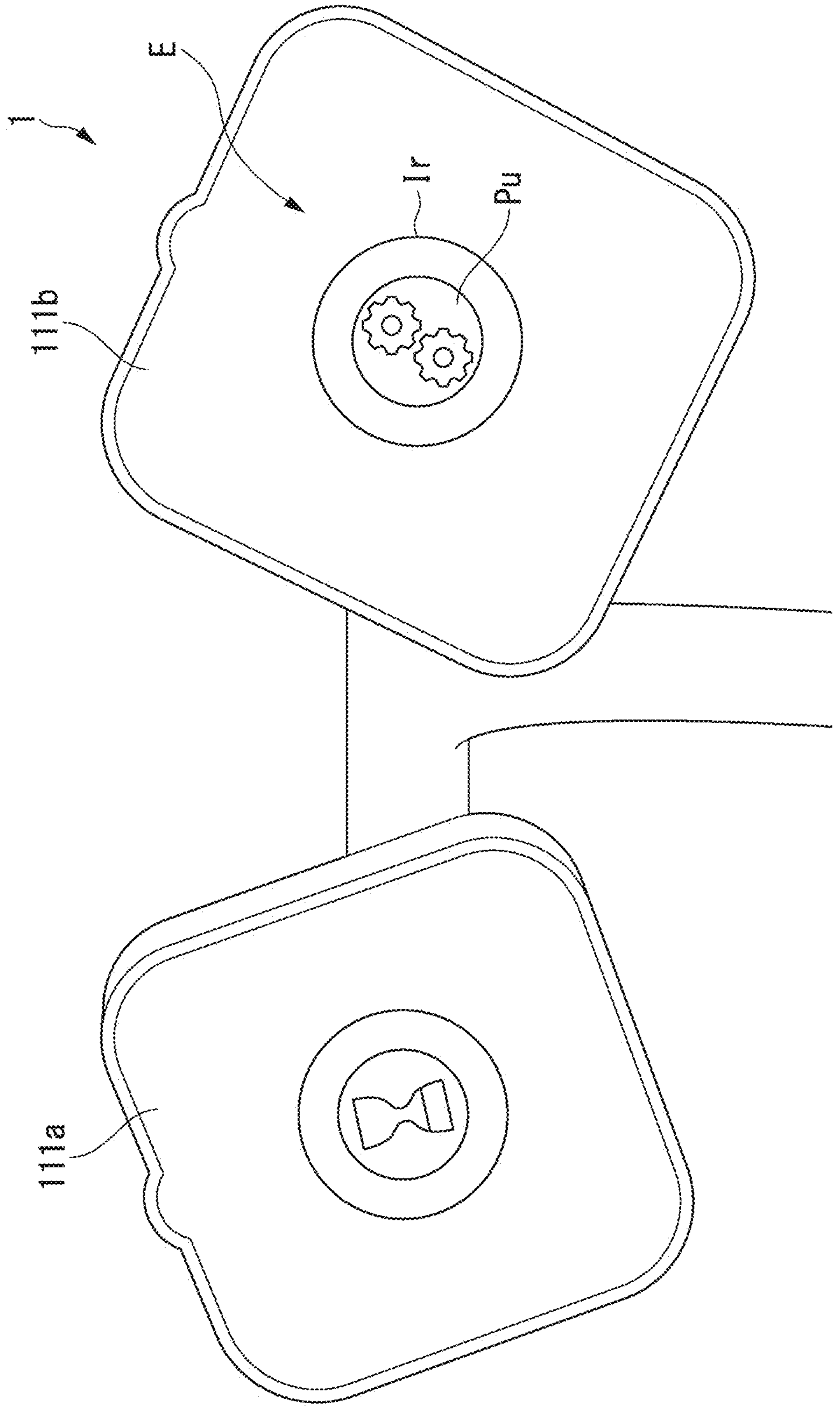
FIG. 8 A view that shows an example of an image of an icon that is shown in the first display mode (pupil display), according to the first embodiment.

The image that is overlain and displayed in the eye or on the eye of the eye display unit 111*a* and the eye display unit 111*b* may be an image of an icon that replaces or is added to the image that is captured by the image capturing unit 102. FIG. 8 is view that shows an example of an image of an icon that is shown in the first display mode (pupil display), according to the first embodiment. In FIG. 8, an example of an icon that shows and image of an hourglass or a gear in the pupil Pu of the eye image E is shown.

Figure 9:
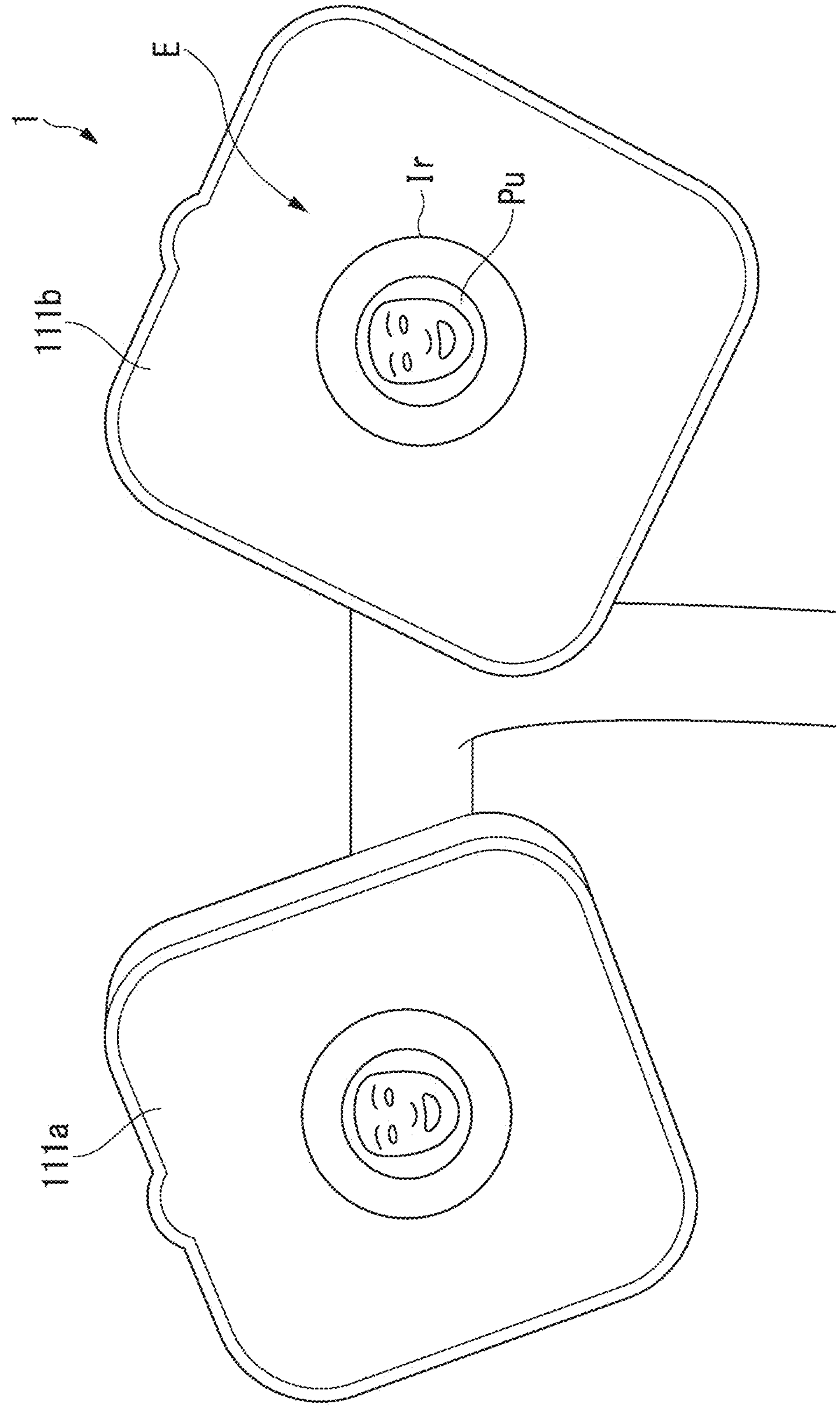
FIG. 9 A view that shows another example of an image of an icon that is shown in the first display mode (pupil display), according to the first embodiment.

FIG. 9 is view that shows another example of an image of an icon that is shown in the first display mode (pupil display), according to the first embodiment. An example where an icon that shows a location which is especially being paid attention to on the face of the person that is the target of attention is shown in the pupil Pu of the eye image E in FIG. 9. Said icon for example, means that out of the face of the person who is the target of attention, an eye thereof is especially being paid attention to.

An icon that is related to the target of attention to which the communication robot 1 is paying attention to, or an arbitrary icon or the like that is related to an operational state or the like of the communication robot 1 are included in said icon. The image of the icon may be an image that is stored in the memory 300 beforehand, and may be an image that is obtained via a network of the internet or the like.

In other words, the image generator 221 is able to adjust the transparency of the target of attention image. The image generator 221 is able to adjust to at least a location where the target of attention image is displayed, or a size thereof on the eye image.

<Process Flow>

Figure 10:
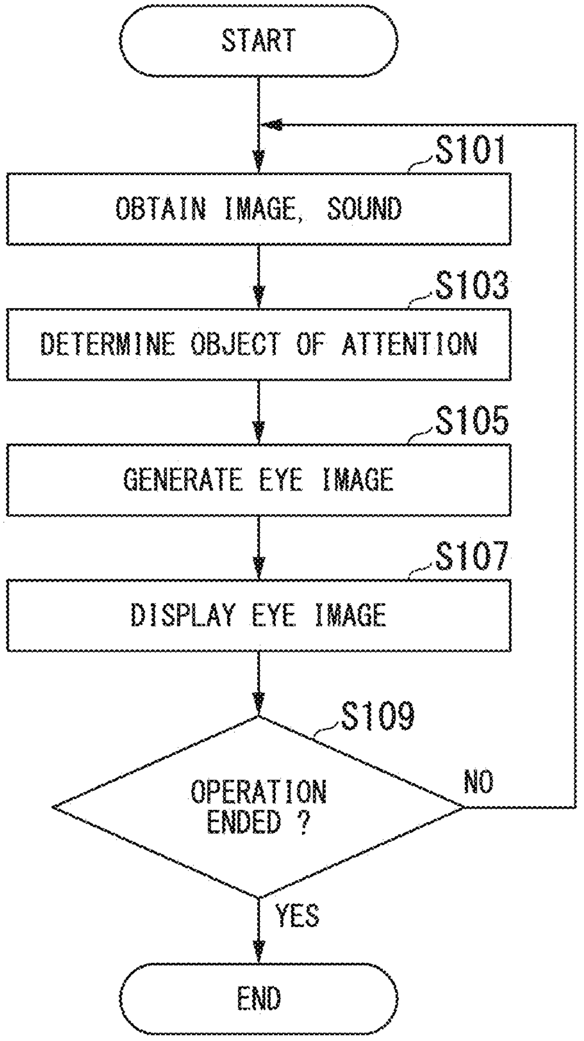
FIG. 10 A flow chart that shows an example of a flow of operations of the communication robot, according to the first embodiment.

Next a process of generation and display of the eye image of the communication robot 1 is explained. FIG. 10 is a flow chart that shows an example of a flow of operations of the communication robot, according to the first embodiment.

First, the acquisition unit 211 obtains image information captured by the image capturing unit 102, and audio information obtained by the sound collector 103 (Step S101).

Next the target of attention determination unit 217 determines the target of attention (Step S103) based on the image information captured by the image capturing unit 102 (processing results of the image information processor 213) and the acoustic signal recorded by the sound collector 103 (processing results of the audio information processor 215). Other than the aforementioned, the target of attention determination unit 217 may judge the target of attention based on contents of current actions of the communication robot 1.

Next, the image generator 221 generates the eye image that is caused to be displayed on the eye display unit 111*a* and on the eye display unit 111*b* (Step S105) based on the determination results of the target of attention using the target of attention determination unit 217, and causes the generated eye image to be displayed on the eye display unit 111*a* and on the eye display unit 111*b* (Step 107). An image that corresponds to the target of attention is included in the eye or on the eye of the eye image that is generated by the image generator 221. For example, in a case where the target of attention is the image of the face of the person in the image captured by the image capturing unit 102, the image of the face of the person is included in the eye or on the eye of the eye image. Or, in a case where the target of attention is an image that corresponds to contents of current actions of the communication robot 1 (for example an image of an icon), the image of the icon is included in the eye or on the eye of the eye image. By confirming the target of attention image that is displayed on the eye display unit 111*a* and on the eye display unit 111*b*, it is possible for the user to grasp what the communication robot 1 is paying attention to.

In a case where the location (relative disposition) of the target of attention (for example, a person) with respect to the communication robot 1 changes, the image generator 221 generates an eye image (video) where both the location (=displayed location of the target of attention image) of the pupil (and/or iris) and the background of the target of attention move. Here, the image generator 221 does not change a size of the target of attention image (reflected image), but uses a model of the eye capable of being greatly downsized more than the captured image, so that it is possible to cover a larger field of vision. The aforementioned is realized by conducting mapping of the small movement of the pupil (and/or the iris), from the large movement of the captured image that is captured by the image capturing unit 102. In other words, the by having the pupil move slightly, it is possible to generate an eye image which expresses that the target of attention has moved largely. As such, similar to when a mirror is looked at from a different perspective, it is possible to obtain an effect (reflection effect in a 3D space) of the perspective of the eye with respect to the target of attention. As the person who is the target of attention moves, different locations of the same scene are displayed. In other words, using the aforementioned mapping, and through simple operations that only use horizontal and/or vertical shifts, it is possible to generate an impression of a perspective of motion that accompanies change (movement) in the target of attention image, in said space. By using various different spatial offsets of the eye, it is possible to form conceptual reflections (images of the target of attention) that are slightly different for each eye, making it is possible to convey a three-dimensional sense of perception to the user via the eye.

Figure 11:
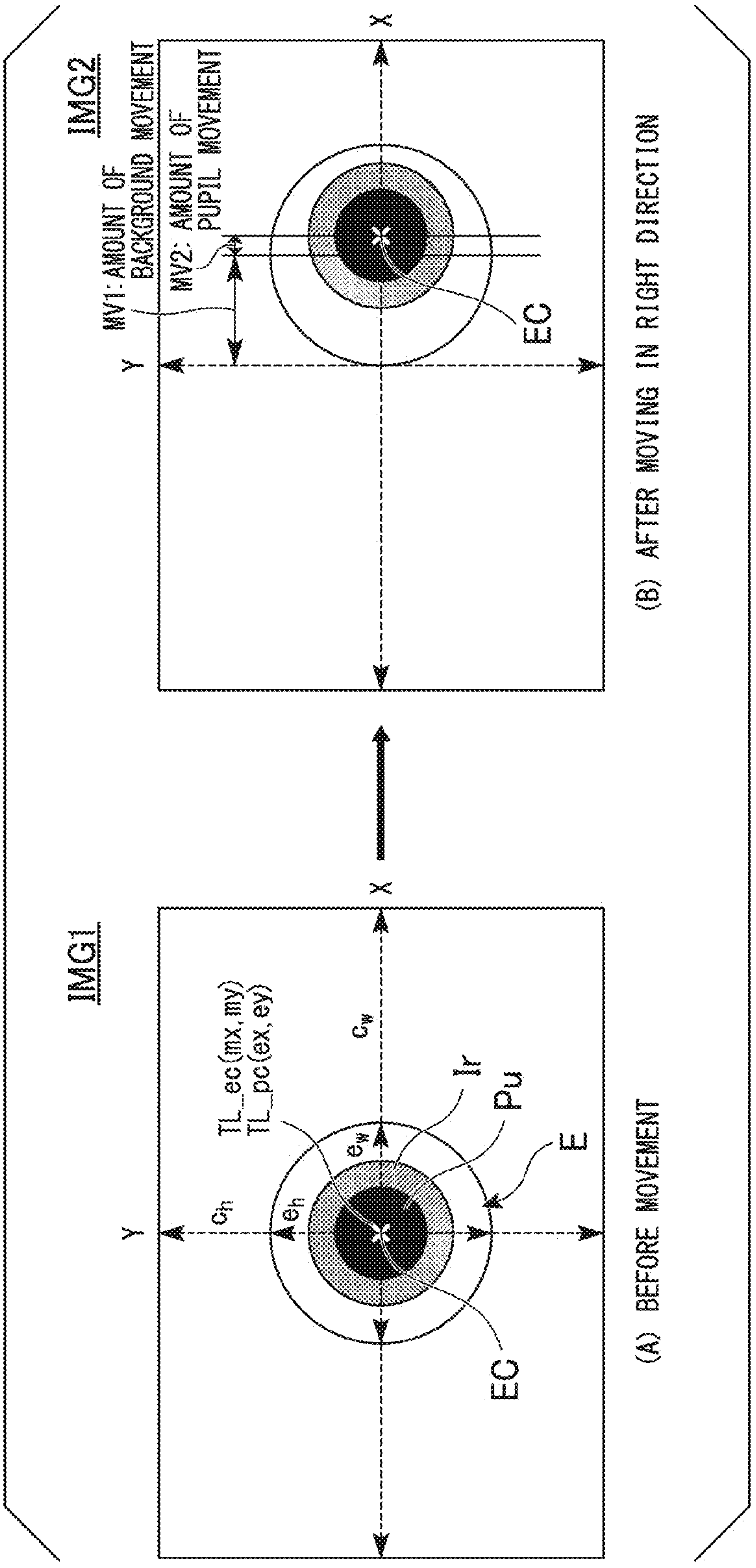
FIG. 11 A view that explains an example of a change of an eye image, according to the first embodiment.

A distance dependent calculation of the spatial offsets of each eye is explained. FIG. 11 is view that explains an example of a change of an eye image, according to the first embodiment. Changes of the image of the eye for example, are generated in a case that includes movement of the target of attention, or a case that includes a change of the target of attention from one target to another target or the like. FIG. 11 shows a captured image IMG1 captured by the image capturing unit 102 before target of attention moves, and a captured image IMG2 captured by the image capturing unit 102 after the target of attention moves. Sizes (pixels) of captured images IMG1 and IMG2 are width $c_w$×width $c_h$. A location that corresponds to the eye image within the captured images IMG1 and IMG2 is target location TL_im ($c_x$, $c_y$) (pixels). In the captured images IMG1 and IMG2, the eye image E that is generated (cut out) by the image generator 221 is approximately a circular shape, and a size thereof is width $e_w$×width $e_h$ (pixels). The target of attention image is overlain on the pupil Pu that is included in the captured eye image E. For example, the background target of attention image is overlain on a region (on the iris Ir or an outside thereof) other than the pupil Pu in the eye image E. A center location of the pupil Pu is TL_pc ($e_x$, $e_y$) (pixels). A center location of the eye image E is TL_ec ($m_x$, $m_y$). An offset in the horizontal direction is $o_x$, and an offset in the vertical direction is $o_y$.

A center location EC of the captured image IMG1, the center location of the pupil Pu TL_pc ($e_x$, $e_y$), and the center location of the eye image E TL_ec ($m_x$, $m_y$) coincide with one another in the captured image IMG1. On the other hand, on the captured image IMG2, the captured image shifts to the left direction (−X direction) with respect to the eye image E, and the location of the eye image E is moved so as to match the target of attention. As a result, only the background image that is overlain on the eye image E is moved by a movement amount MV1 in the X direction. Further, the center location of the pupil Pu TL_pc ($e_x$, $e_y$) is only shifted by a movement amount MV2 in the X direction, from the center location of the eye image E (the position of the pupil Pu with respect to the white of the eye shifts). The movement amount MV2 is smaller than the movement amount MV1. By having the movement of the background image and the movement of the pupil Pu be continuous or concurrent operations, it is possible to simulate movements and pauses of a human eye.

It is possible to calculate the aforementioned center location of the pupil Pu TL_pc ($e_x$, $e_y$) using equation (1) and equation (2) below:

$$e_y = c_y - m_y + e_h/2 \tag{1}$$

$$e_x = c_x - n_x(c_w - e_w) \tag{2}$$

It is possible to calculate the center location of the eye image E TL_ec ($m_x$, $m_y$) using equation (3) and equation (4) below:

$$m_y = n_y(c_h - e_h) + e_h/2 \tag{3}$$

$$m_x = (1 - n_x)(c_w - e_w) + e_w/2 \tag{4}$$

In the aforementioned equations (1) to (4), $n_x$ and $n_y$ are constants related to offsets, and are defined by equations (5) and (6) below:

$$n_x = c_x/c_w + o_x \tag{5}$$

$$n_y = c_y/c_h + o_y \tag{6}$$

It is possible to have the offsets in the horizontal and the vertical directions be functions of a distance (for example, a distance from one another, a distance from the camera to the target of attention) between the target of attention and the location of the model of the eye used in a three-dimensional space. As such, by simulating a parallax in both eyes, it is possible to have the eyes of the communication robot 1 exhibit more human like behavior. Equations (1) to (6) above only represent one example, and having changes made thereto, or different equations used is possible.

Next, the controller 200 determines whether or not operations of the communication robot 1 have ended (Step S109). For example, in a case where the communication robot 1 receives an end instruction from the user, the controller 200 determines that operations of the communication robot 1 are ended (Step S109; YES). On the other hand, in a case where the controller 200 decides that the operations of the communication robot 1 have not ended (Step S109; NO), then Step S101 is returned to, and processes that follow are repeated. By repeating the aforementioned operations, the video and the target of attention image are displayed on the eye display unit 111*a* and on the eye display unit 111*b*. In such video and image, the eyes of the eye display unit 111*a* and of the eye display unit 111*b* follow the target of attention, and the eyes of the communication robot 1 move so as to include the target of attention image within. With the above, processing of the flow chart is ended.

<Utilization Examples of the Communication Robot>

Figure 12:
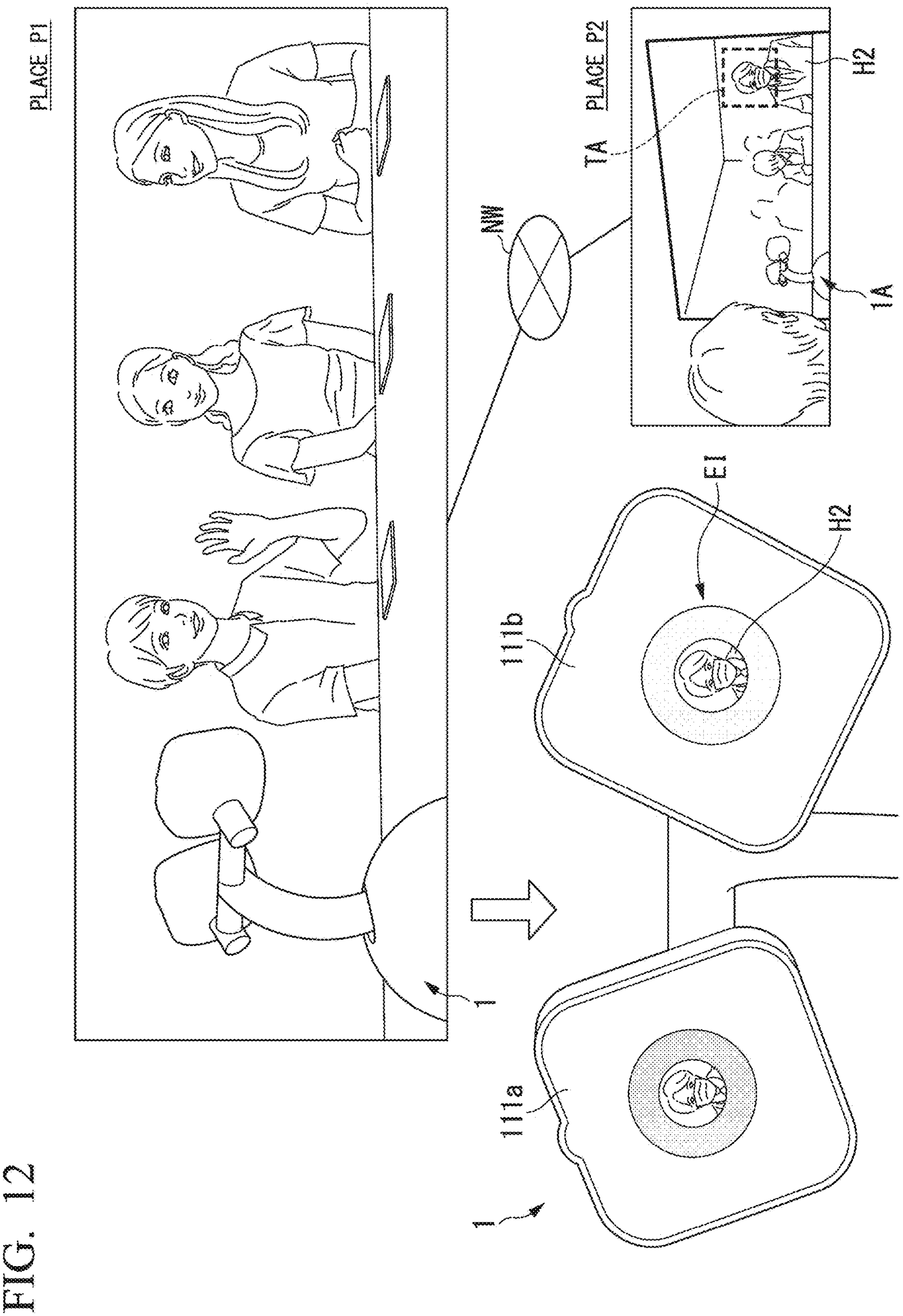
FIG. 12 A diagram that shows utilization examples of the communication robot, according to the first embodiment.
Figure 13:
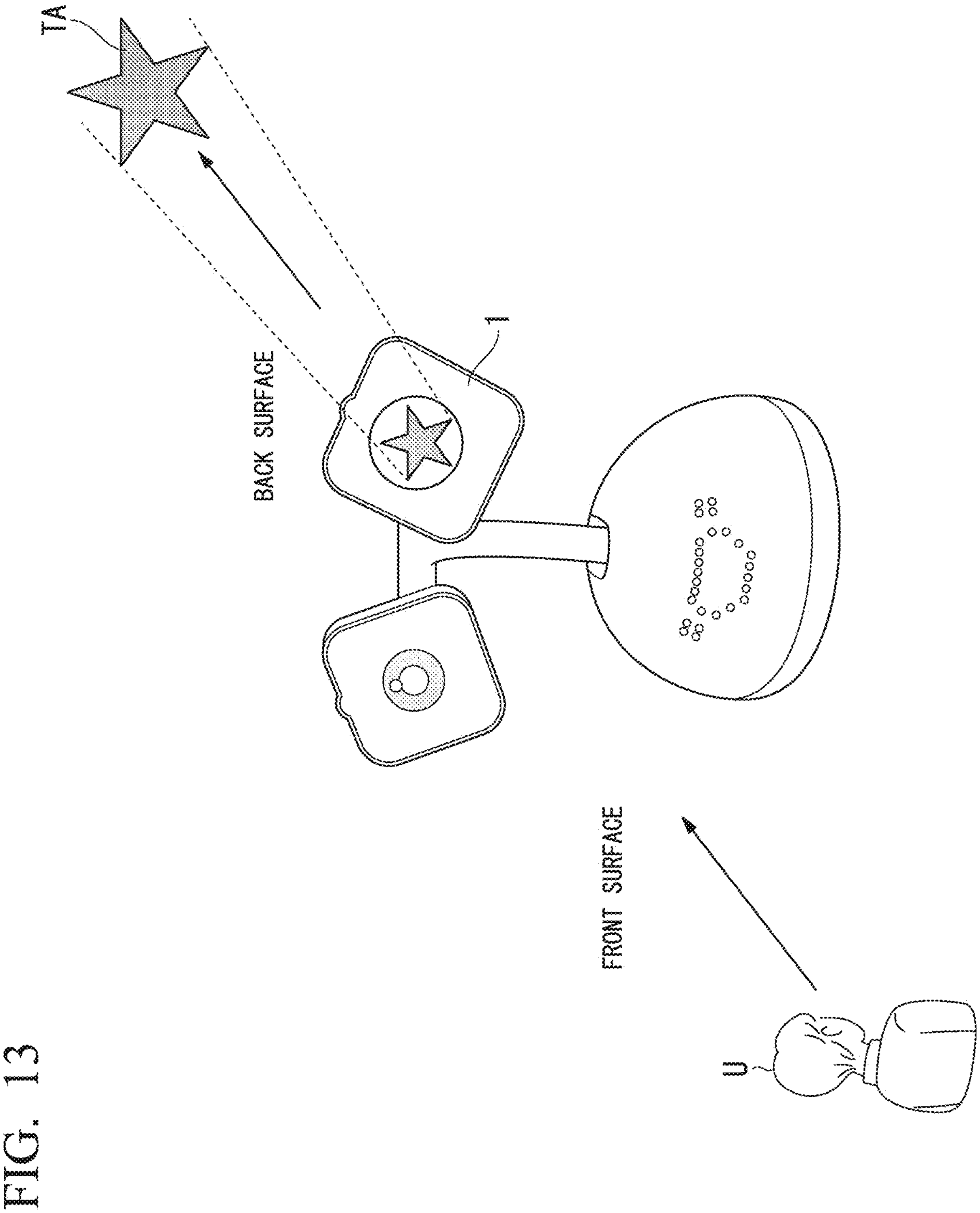
FIG. 13 A diagram that shows a utilization example the communication robot, according to the first embodiment.

Next, utilization examples of the communication robot 1 are explained. FIG. 12 and FIG. 13 are diagrams that show utilization examples of the communication robot, according to the first embodiment. In FIG. 12, a utilization example where the communication robot 1 is utilized for an event taking place in an environment where two different places (place P1 and place P2) are connected by a network NW is explained. The communication robot 1 is disposed on the place P1, and a communication robot 1A is disposed in the place P2. Around the time that this event takes place, a caller is person H2 in the place P2, and in a case where the communication robot 1A determines that the person H2 is the target of attention TA, an image of the person H2 determined to be the target of attention TA is displayed on the eye display unit 111*a* and displayed on the eye display unit 111*b* of the communication robot 1A. Here, the image of the person H2 in place P2 determined to be the target of attention TA by the communication robot 1A is also shown on the eye display unit 111*a* and shown on the eye display unit 111*b* of the communication robot 1 disposed in P1. By having such configuration, it is possible to grasp what a communication robot disposed in another place is paying attention to, and it is possible to create a feeling of unity within the event.

In FIG. 13, while the communication robot 1 is communicating with person U, the target of attention TA that is located behind the communication robot 1 is displayed on the eye display unit 111*a* and displayed on the eye display unit 111*b*. With such configuration, it is possible for the person U to confirm the target of attention TA via the eye display unit 111*a* and the eye display unit 111*b*, even if the target of attention TA is located on a blind spot of the communication robot 1 and is not visible.

Other than the aforementioned, the eye display unit 111*a* and the eye display unit 111*b* may mimic operations of the target of attention TA. For example, when eyes of a person who is the target of attention TA are closed (when winking), the eye shown on the eye display unit 111*a* and the eye shown on the eye display unit 111*b* may be made to close as well. A 3D face mesh of the person who is the target of attention TA may be overlain on the eye display unit 111*a* and on the eye display unit 111*a*. Accordingly, it is possible for the user to further understand what the communication robot is looking at, and how the communication robot understands what the communication robot is looking at.

As in the above, according to the first embodiment, it is possible for the communication robot to provide information regarding the target of attention to the user. Since the eye image of the communication robot is larger than a human eye, it is possible to easily provide information relating to the target of attention of the communication robot, and it is possible to easily attract the attention of the user. With the communication robot according to the first embodiment, it is possible to conduct the two steps of grasping what the target of attention of the other person during normal communication between persons (the two steps of grasping a direction the other person is paying attention to, and mapping out the space in said direction to identify the target of attention), and it is possible to realize effective communication.

Second Embodiment

Next, a second embodiment of the present invention is explained. In the present embodiment, a wearable terminal that is detachable, is a display device that makes it possible to provide information regarding a target of attention of the user to an outside thereof. In the embodiment below, configurations having the same functions as the first embodiment have the same names and reference signs affixed thereto, with detailed explanations thereof being omitted.

<Display Device Outline>

The display device according to the present embodiment is a wearable terminal VR (Virtual Reality) glasses, an AR (Augmented Reality) glasses or the like. It is possible for the display device to display digital contents which are overlain or the like on a virtual space, or on a real space, to a user having the same display device attached to their person. It is possible for said display device to provide information about the target of attention of the user having the same display device attached to their person to the outside thereof. Said display device for example, is used in a place where a plurality of persons gather (classroom, meeting room or the like), and provides information on the target of attention of the user wearing the display device to a third person present with the user. The target of attention for example, is an arbitrary object that exists in the real space (person, thing or the like), or an arbitrary object (person, thing or the like) that exists in the virtual space and is shown on the display device. The display device is one example of a "Display System".

Figure 14:
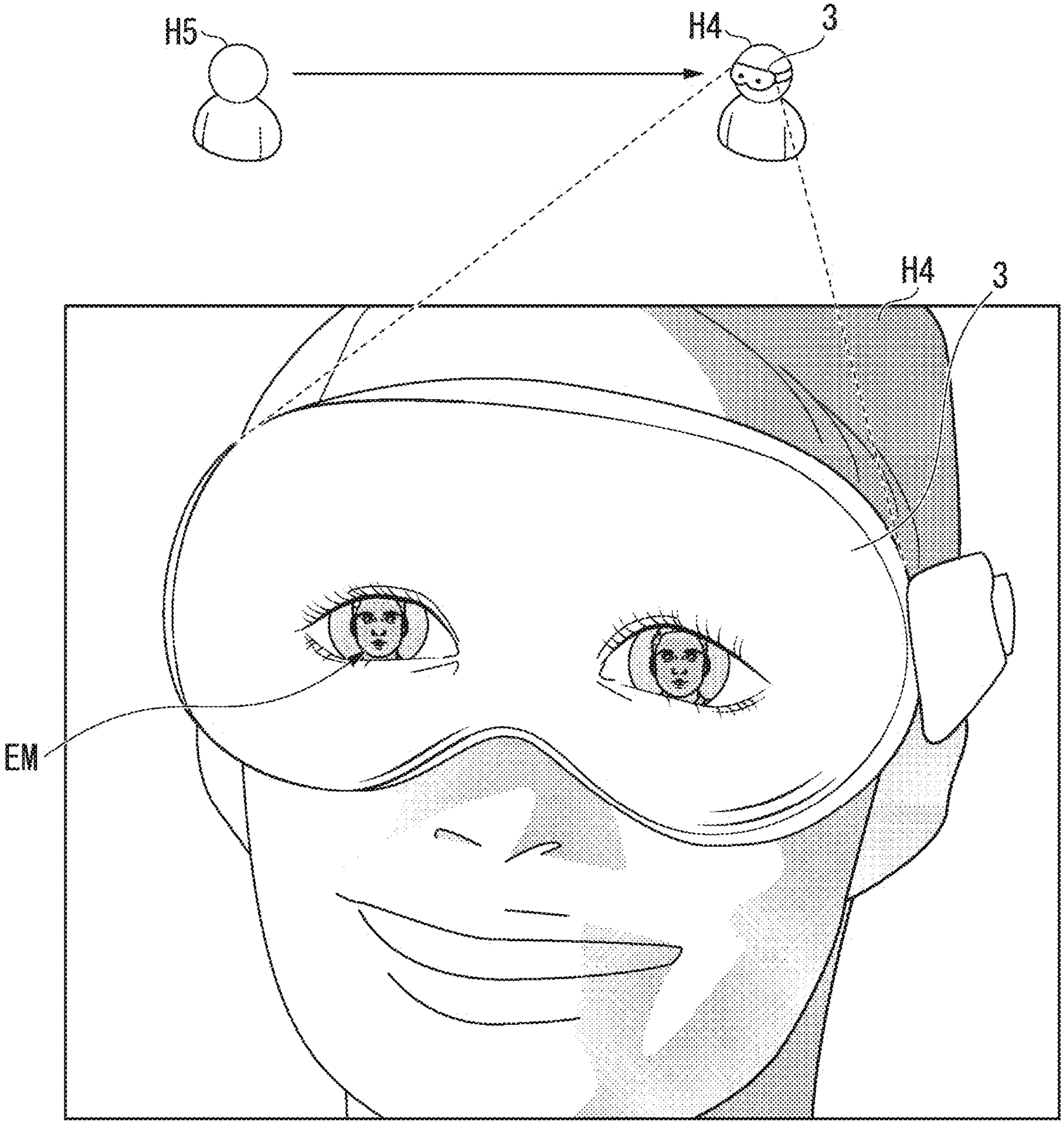
FIG. 14 A view that shows an example of a usage environment of a display device 3, according to a second embodiment.

FIG. 14 is a view that shows an example of a usage environment of a display device 3, according to the present embodiment. In said example, a user H4 wearing the display device 3 is in the same space as a user H5 not wearing the display device. The eye image EM of the user H4 is displayed on an outer surface (for example, a lens on an outer surface of the lens of the VR glasses) of the display device 3 that the user H4 is wearing. The eye image EM is the eye image of the user 4. The eye image EM may be a captured real-time image, or may be an image captured beforehand. The eye image EM may also be an image of a human eye, or an image that replicates aspects of a human eye. An image of a target of attention ("target of attention" hereinafter) that the user H4 is paying attention to is overlain and displayed on said eye image EM. In this example, an image of the user H5 is overlain and displayed as the target of attention. By having the user H5, who is the third person, be capable of confirming the eye image EM on the outer surface of the display device 3 worn by the user H4, it is possible to grasp (in this example, by user H5) what the target of attention of the user H4 is.

Figure 15:
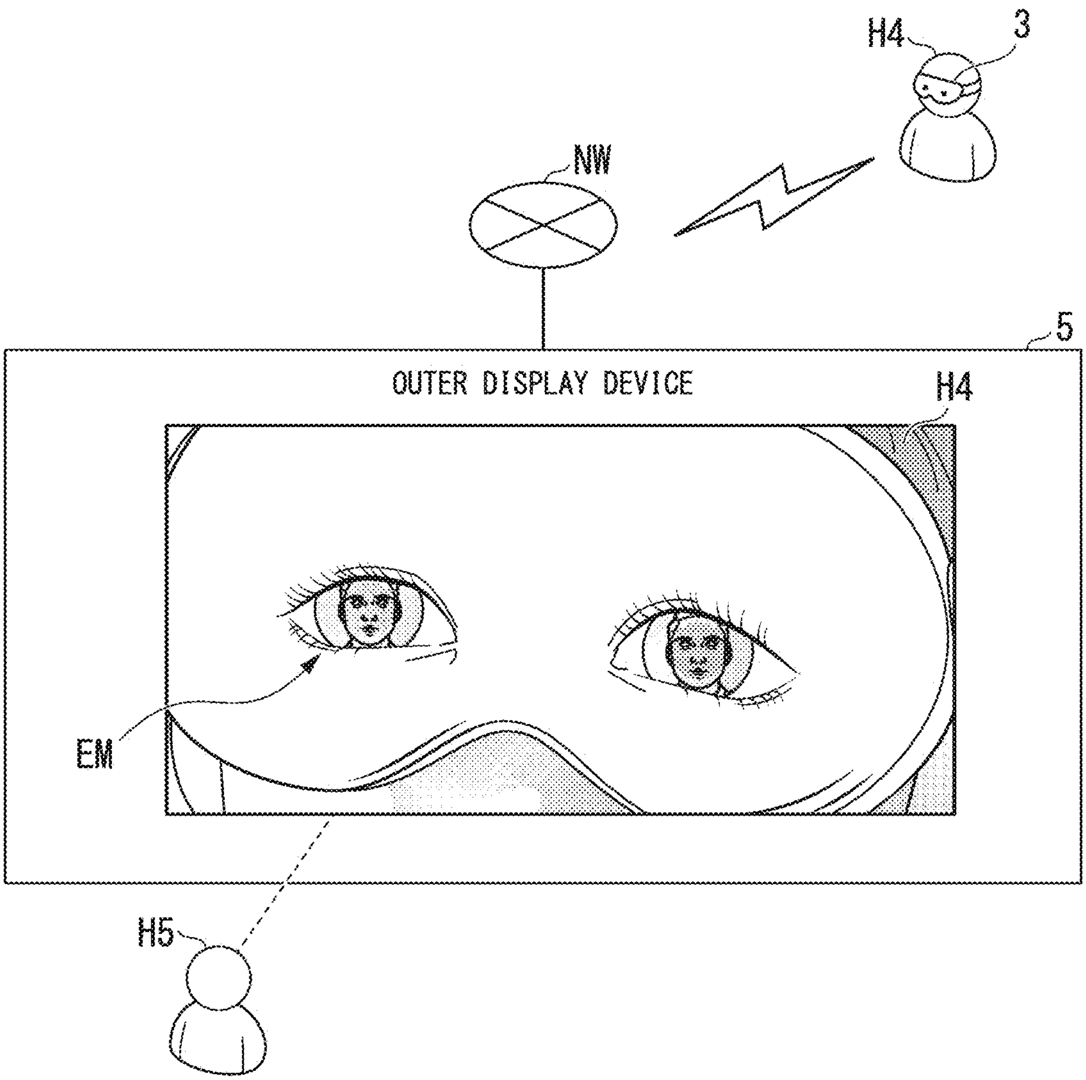
FIG. 15 A view that shows another example of a usage environment of the display device 3, according to the second embodiment.

FIG. 15 is a view that shows another example of a usage environment of the display device 3, according to the present embodiment. In this example, the user H4 who is wearing the display device 3, is in the same space as the user H5 who is not wearing the display device. An outer display device 5, which is connected so as to able to communicate with the display device 3 via a network NW, is disposed in said space. An image of the user H4 is shown, along with the eye image EM of the user H4, on the outer display device 5. The eye image EM is the eye image of the user H4. The target of attention of the user H4 is overlain and displayed on the eye image EM. In this example the image of the user H5 is overlain and displayed as the target of attention. By having the user H5, who is the third person, be capable of confirming the eye image EM displayed on the outer display device 5, it is possible (the user H5 in this example) to grasp the target of attention of the user H4.

Figure 16:
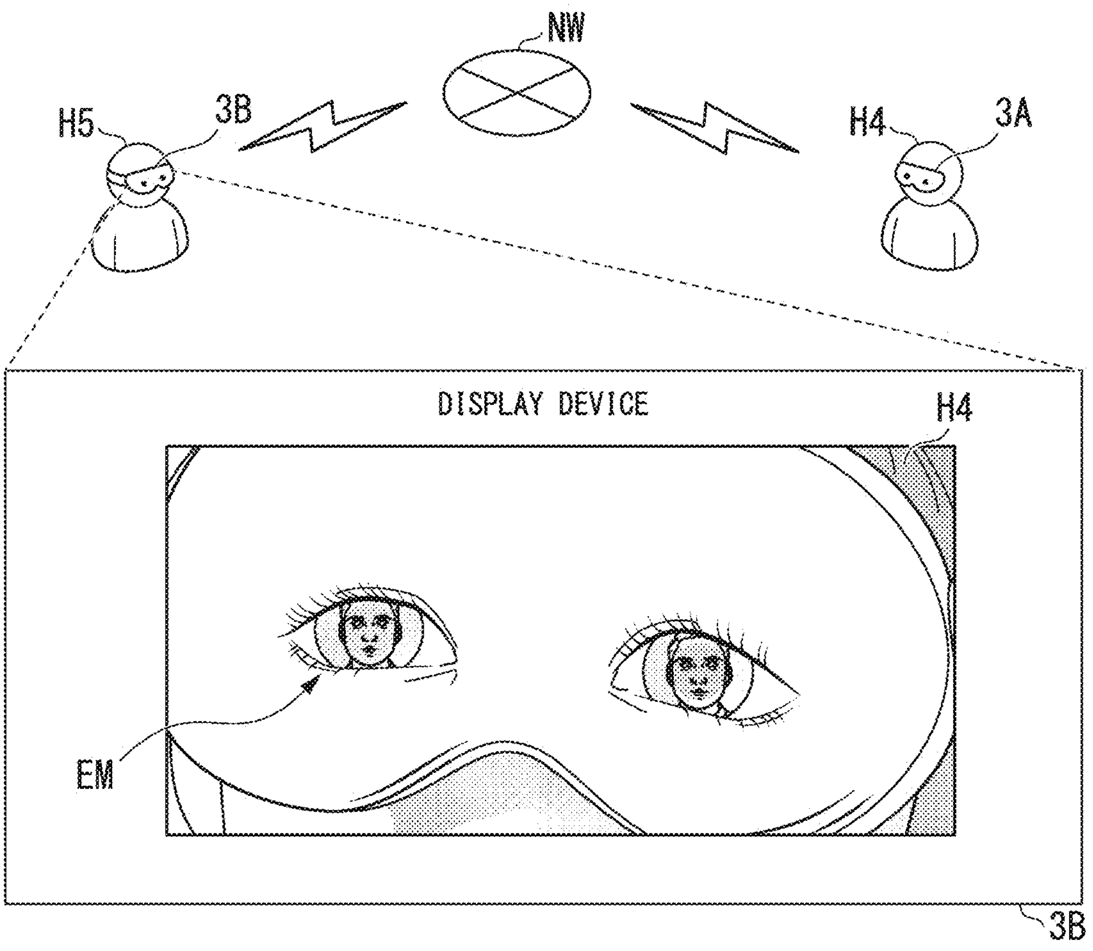
FIG. 16 A view that shows yet another example of a usage environment if the display device 3, according to the second embodiment.

FIG. 16 is a view that shows yet another example of a usage environment if the display device 3, according to the present embodiment. In this example, the user H4 who is wearing a display device 3A, is in the same space as the user H5 who is wearing a display device 3B. The display device 3A and the display device 3B are connected so as to be able to communicate via the network NW. An image of the user H4 that includes the eye image EM of the user H4 is visible to the user H5 on a display unit of the display device 3B. The eye image EM is the eye image of the user H4. Said eye image EM is overlain and displayed on the target of attention of the user H4. In this example, an image of the user H5 is overlain and displayed as the target of attention. By having the user H5, who is the third person, be capable of confirming the eye image EM displayed on the display device 3B, it is possible (the user H5 in this example) to grasp the target of attention of the user H4.

<Configuration Example of the Display Device>

Figure 17:
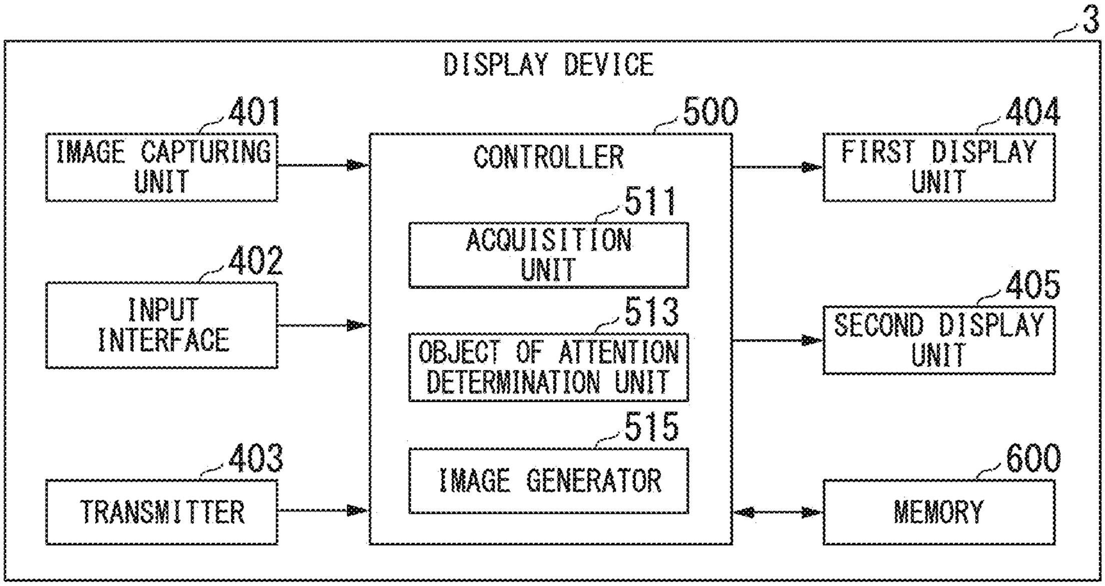
FIG. 17 A functional block diagram that shows a configuration example of the display device 3, according to the second embodiment.

Next, a configuration example of the display device according to the present embodiment is explained. FIG. 17 is a functional block diagram that shows a configuration example of the display device 3, according to the present embodiment. The display device 3 for example, includes an image capturing unit 401, an input interface 402, a transmitter 403, a first display unit 404, a second display unit 405, a controller 500, and a memory 600.

The image capturing unit 401 includes an outside camera that captures an image of an outside environment which is visible to a user wearing the display device 3, and an inside camera that captures an image of the eyes of the same user. The image capturing unit 401 is for example, a CMOS image element, or a CCD image element or the like. The image includes any one of a still image, continuous still images, or a video.

The input interface 402 receives various operations from the user. The input interface 402 is a physical operational portion (switches or the like) that is provided on the display device 3. The input interface 402 may also be a virtual operational portion (buttons or the like) provided on a vertical space that is shown on the first display unit 404.

The transmitter 403 is a transmission interface for conducting wired or wireless transmission with display devices worn by other users, or with an outer display device (display screen or the like).

The first display unit 404 overlays and provides a display of digital contents overlain on the real world, a display of a virtual space, or a display of a remote space or the like to a user wearing the display device 3. The first display unit 404 for example, is a display unit provided on a portion of a lens on an inside (user side, inner surface) of VR glasses or AR glasses.

The second display unit 405 displays the eye image EM of the same user, so that the image is visible from an outside of the user wearing the display device 3. The second display unit 405 for example, is a display provided on an outside (side opposite to user, outer surface) of the lens of the VR glasses or the AR glasses. The eye image EM displayed on said second display unit 405 is the eye image of the user wearing the display device 3. A target of attention image of the user is overlain and displayed on said eye image EM. It is possible for a third user to grasp an attention target of the user by confirming an eye image displayed on the second display unit 405.

The controller 500 for example, includes an acquisition unit 511, a target of attention determination unit 513, and an image generator 515. The aforementioned various functional portions are each for example, realized by having a hardware processor (computer) of a CPU or the like execute a program (software). All of a portion of the aforementioned configuration components may be realized using hardware such as an LSI or ASIC, FPGA, GPU, SOC or the like (circuit portion; includes circuitry), or may be realized by a collaboration of software and hardware. The program may be stored beforehand on an HDD or flash memory device of the display device 3 (memory device that includes a non-transient storage medium), may be stored on a removable store medium such as a DVD or CD-ROM or the like, or may be installed on an HDD or a flash memory by having a storage medium (non-transient storage medium) be attached to a drive device of the display device 3.

The acquisition unit 511 for example, obtains captured image information from the image capturing unit 401, instruction information that is input via the input interface 402, and eye image information of the other user that is sent from the other display device. The acquisition unit 511 may obtain desired image information via a network or the like of the internet.

The target of attention determination unit 513 determines the target of attention of the user wearing the display device 3 at various instances. For example, the target of attention determination unit 513 determines a direction of a gaze of the user, and determines objects that exist in a real space which is located in the gaze direction and objects that exist in a virtual space which is located in the gaze direction as the target of attention, based on the image of the eye of the user captured by the image capturing unit 401. The object that exists in the real space is determined by matching a value of the image captured using the image capturing unit 401 (outside camera) or a depth sensor and the like, with the determined gaze direction. The object that exists in the virtual space is determined by matching a virtual image that is shown on the first display unit 404 with the determined gaze direction. Besides the above, the target of attention determination unit 513 may determine the target of attention based on instruction of the user input via the input interface 402. Along with determining the target of attention, the target of attention determination unit 513 may also be made to determine a degree of attention to the target of attention.

The image generator 515 generates the eye image that is caused to be displayed on the second display unit 405 based on the determination results of the target of attention using the target of attention determination unit 513, and causes the generated eye image to be displayed on the second display unit 405. The image generator 515 generates the image (for example, the virtual image) that is caused to be displayed on the first display unit 404, and causes the generated image to be displayed on the first display unit 404.

An image that corresponds to the target of attention is included in the eye or on the eye image generated by the image generator 515. For example, in a case where the target of attention is a face of person that exists in the real space, the image of the face of the person is overlain and displayed in the eye or on the eye of the eye image. In other words, in a case where the target of attention that exists in the virtual space is an object, an image of the object is overlain and displayed in the eye or on the eye of the eye image.

The image generator 515 is an example if an "image generator". The image generator 515 causes the generated eye image to be displayed on the display provided on the outer surface of the wearable display device. The image generator 515 causes the generated eye image to be displayed on an outer display that is connected so as to be able to communicate with the wearable device. The image generator 515 causes the generated eye image to be displayed on displays of other wearable devices which are connected so as to be able to communicate with the wearable device.

The memory 600 stores various controls of the display device 3, programs needed for processing, algorithms, learning models, predetermined values, threshold values or the like. The memory 600 may be realized by any of the various aforementioned storage devices, in other words, an SSD, EEPROM, ROM, or RAM or the like. The memory 600 may be disposed on a cloud, and may be connected via a network.

<Process Flow>

Figure 18:
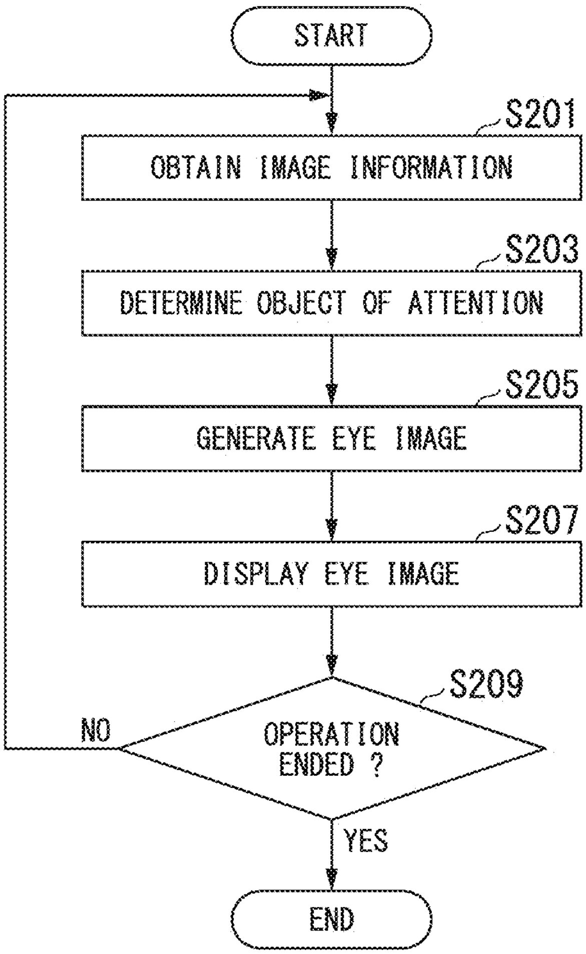
FIG. 18 A flow chart that shows an example of a flow of operations of the display device 3, according to the second embodiment.

Next, a processing of the display device 3 is explained. FIG. 18 is a flow chart that shows an example of a flow of operations of the display device 3, according to the present embodiment.

First, the acquisition unit 511 obtains image information that is captured by the image capturing unit 401, and instruction information that is input via the input interface 402 (Step S201).

Next, the target of attention determination unit 513 determines the target of attention of the user wearing the display device 3 (Step S203). For example, the target of attention determination unit 513 determines the gaze direction of the user based on the image of the eye of the user captured by the image capturing unit 401, and determines an object that exists in the real space which is located in the determined gaze direction, and an object that exists in the virtual space which is located in the determined gaze direction as the target object.

Next, the image generator 515 generates an eye image that is caused to be displayed on the second display unit 405 (Step S205), and causes the generated eye image to be displayed on the second display unit 405 (Step S207). An image that corresponds to the target of attention is overlain and displayed in the eye or on the eye of the eye image generated by the image generator 515. It is possible for a third person to grasp what the user wearing the display device 3 is paying attention to by confirming the target of attention image that is displayed on the second display unit 405.

In a case where a configuration such as the configuration of the outer display device 5 in FIG. 15 is used, the image generator 515 sends the generated image to the outer display device 5 via the transmitter 403. As such, the eye image of the user wearing the display device 3 is shown on the outer display device 5. Therefore, it is possible for a third person to grasp what the user wearing the display device 3 is paying attention to by confirming the eye image that is displayed on the outer display device 5.

In a case where transmission between display devices is conducted as in the configuration shown in FIG. 16, the image generator 515 transmits the generated eye image of one device to the other display device via the transmitter 403. Accordingly, the eye image of the user wearing the display device 3 is displayed on the other display device. As such, it is possible for a third person to grasp what the user wearing the display device 3 is paying attention to by confirming the eye image that is displayed on the other display device (first display unit 404).

Next, the controller 500 determines whether operations of the display device 3 have ended or not (Step S209). For example, in a case where an end instruction is received from the user, the controller 500 determines that the display device 3 ended operation (Step S209; YES). On the other hand, when the controller 500 determines that the display device 3 did not end operation (Step S209; NO), step S201 is returned to, and processes are repeated from there. By repeating such operations, the video and target of attention image is displayed on the second display unit 405. In such video and image, the eye displayed on the second display unit 405 follows the target of attention, and the eye moves such that the target of attention on the center of the image of the eye is included. With the above, the present flow chart ends processing.

As in the above, according to the second embodiment, it is possible to provide suitable aspects of human communication by eliminating ambiguity as much as possible regarding information about the target of attention and/or a direction of attention of a user wearing the display device 3.

Although various configurations were used to explain the embodiments of the present invention, the present invention is in no way limited to, or by the aforementioned embodiments, and so long as the technical scope of the present invention is not deviated from, the various configurations may be changed or replaced.

What is claimed is:

1. A display system comprising a processor configured to execute a program to:

determine a target of attention; and generate an eye image which displays an image related to a target of attention that is overlain and displayed in an eye or on the eye, the eye being an image that imitates a view of a human eye or an image obtained by capturing a human eye, and cause the eye image to be displayed on a display device;

wherein the processor causes the eye image, which is a video of a changing target of attention that is overlain and displayed in the eye or on the eye according to determination results of the target of attention, to be displayed on the display device.

2. The display system according to claim 1, wherein the processor adjusts a transparency of the target of attention.

3. The display system according to claim 1, wherein the processor adjusts at least a location where the target of attention is displayed, or a size thereof on the eye image.

4. The display system according to claim 1, wherein the processor generates the target of attention by adjusting a captured target of attention.

5. The display system according to claim 1, wherein the target of attention is persons that exist in a surrounding environment of the display system, or persons that exist in a separate environment that is connected so as to be able to communicate with the display system.

6. The display system according to claim 1, wherein the eye image includes an image of a background of the target of attention that changes along with a change of the target of attention.

7. The display system according to claim 6, wherein the processor generates eye images, which are a video that combines a movement of a display location of the eye and the movement of the background on an inside of the eye image.

8. The display system according to claim 1, wherein the processor determines the target of attention based on images captured from the surrounding environment of the display system, or from the separate environment that is connected so as to be able to communicate with the display system.

9. The display system according to claim 8, wherein the processor generates the target of attention by extracting portions that correspond to the target of attention from the captured image.

10. The display system according to claim 1, wherein the processor determines the target of attention based on an operational state of the display system.

11. The display system according to claim 10, wherein the target of attention is an image that is related to the operational state of the display system.

12. The display system according to claim 1, wherein the display system is a communication system that conducts communication with a human, and the target of attention is a target that the communication system is paying attention to.

13. The display system according to claim 1, wherein the display system is a display device wearable by the person, and the target of attention is a target that the user is paying attention to.

14. The display system according claim 13, wherein the processor causes a generated eye image to be displayed on an outer display that is provided on the wearable device.

15. The image generator according to claim 13, wherein the processor causes the generated eye image to be displayed on an outside display device that is connected so as to be able to communicate with the wearable device.

16. The image generator according to claim 13, wherein the processor displays the generated eye image on displays of other wearable devices which are connected so as to be able to communicate with the wearable device.

17. A display method that is performed by a computer of a display system, the display method comprising:

determining a target of attention;

generating an eye image which displays an image related to a target of attention that is overlain and displayed in an eye or on the eye, the eye being an image that imitates a view of a human eye or an image obtained by capturing a human eye;

causing the generated eye image to be displayed on a display device; and causing the eye image, which is a video of a changing target of attention that is overlain and displayed in the eye or on the eye according to determination results of the target of attention, to be displayed on the display device.

18. A non-transitory computer-readable storage medium storing a program for causing a computer of a display system to:

cause a target of attention to be determined;

cause an eye image which displays an image related to a target of attention that is overlain and displayed in an eye or on the eye to be generated, the eye being an image that imitates a view of a human eye or an image obtained by capturing a human eye;

cause the generated eye image to be displayed on a display device; and cause the eye image, which is a video of a changing target of attention that is overlain and displayed in the eye or on the eye according to determination results of the target of attention, to be displayed on the display device.

* * * * *